(12) United States Patent
Steffens et al.

(10) Patent No.: US 11,186,008 B2
(45) Date of Patent: Nov. 30, 2021

(54) HYDRAULIC AND COOLING SYSTEMS

(71) Applicant: Oshkosh Corporation, Oshkosh, WI (US)

(72) Inventors: Greg Steffens, Oshkosh, WI (US);
Jesse Steinke, Oshkosh, WI (US);
Yanming Hou, Rochester, MN (US);
Neil Bjornstad, Oshkosh, WI (US);
Jeremy Andringa, Oshkosh, WI (US);
Eric Wall, Oshkosh, WI (US); Connor Hietpas, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 95 days.

(21) Appl. No.: 16/813,042

(22) Filed: Mar. 9, 2020

(65) Prior Publication Data

US 2020/0290237 A1    Sep. 17, 2020

Related U.S. Application Data

(60) Provisional application No. 62/817,340, filed on Mar. 12, 2019.

(51) Int. Cl.
*B28C 5/42* (2006.01)
*B28C 5/46* (2006.01)

(52) U.S. Cl.
CPC ............ *B28C 5/4213* (2013.01); *B28C 5/468* (2013.01)

(58) Field of Classification Search
CPC ........... B28C 5/4213; B28C 5/468; B60P 3/16

USPC ..................................................... 366/60–61
See application file for complete search history.

(56) References Cited

U.S. PATENT DOCUMENTS

| | | | |
|---|---|---|---|
| 4,542,990 A * | 9/1985 | Fouquet ................ | B60K 17/10 366/61 |
| 6,074,083 A * | 6/2000 | Gebhard ............... | B28C 5/4213 366/61 |
| 9,045,014 B1 | 6/2015 | Verhoff et al. | |
| 9,656,640 B1 | 5/2017 | Verhoff et al. | |
| 2003/0163228 A1 | 8/2003 | Pillar et al. | |
| 2003/0163229 A1 | 8/2003 | Pillar et al. | |
| 2003/0163230 A1 | 8/2003 | Pillar et al. | |
| 2003/0171854 A1 | 9/2003 | Pillar et al. | |
| 2004/0069865 A1 | 4/2004 | Rowe et al. | |
| 2004/0199302 A1 | 10/2004 | Pillar et al. | |
| 2007/0061054 A1 | 3/2007 | Rowe et al. | |
| 2007/0185625 A1 | 8/2007 | Pillar et al. | |
| 2008/0205188 A1 | 8/2008 | Lindblom et al. | |
| 2008/0221754 A1 | 9/2008 | Rowe et al. | |
| 2009/0154287 A1 | 6/2009 | Lindblom et al. | |
| 2011/0058446 A1 | 3/2011 | Khouri | |
| 2013/0107656 A1 | 5/2013 | Datema et al. | |

(Continued)

*Primary Examiner* — Charles Cooley

(74) *Attorney, Agent, or Firm* — Foley & Lardner LLP

(57) ABSTRACT

A hydraulic system for a concrete mixer vehicle including an electronically controlled variable displacement hydraulic pump, a distribution manifold fluidly coupled to the hydraulic pump, a hydraulic fan motor coupled to a fan and fluidly coupled to the distribution manifold, an auxiliary system fluidly coupled to the distribution manifold, and a controller structured to: determine a total system demand based at least in part on a fan motor demand and an auxiliary system demand, adjust a displacement of the hydraulic pump to satisfy the total system demand, and operate the hydraulic pump at a pump speed to satisfy the total system demand.

20 Claims, 22 Drawing Sheets

(56) References Cited

U.S. PATENT DOCUMENTS

| | | |
|---|---|---|
| 2014/0271066 A1 | 9/2014 | Hou |
| 2015/0151651 A1 | 6/2015 | Stingle et al. |
| 2015/0232269 A1 | 8/2015 | Hou |
| 2015/0246331 A1 | 9/2015 | Broker et al. |
| 2016/0304051 A1 | 10/2016 | Archer et al. |
| 2017/0225888 A1 | 8/2017 | Betz et al. |
| 2017/0253221 A1 | 9/2017 | Verhoff et al. |
| 2017/0361491 A1 | 12/2017 | Datema et al. |
| 2017/0361492 A1 | 12/2017 | Datema et al. |
| 2018/0250847 A1 | 9/2018 | Wurtz et al. |
| 2019/0091890 A1 | 3/2019 | Rocholl et al. |
| 2019/0106083 A1 | 4/2019 | Archer et al. |
| 2019/0161272 A1 | 5/2019 | Betz et al. |
| 2019/0217698 A1 | 7/2019 | Broker et al. |
| 2019/0276102 A1 | 9/2019 | Zuleger et al. |
| 2019/0292975 A1* | 9/2019 | Hou .................. B60H 1/00014 |
| 2019/0344475 A1 | 11/2019 | Datema et al. |
| 2019/0351883 A1 | 11/2019 | Verhoff et al. |
| 2020/0078986 A1 | 3/2020 | Clifton et al. |
| 2020/0230841 A1 | 7/2020 | Datema et al. |
| 2020/0230842 A1 | 7/2020 | Datema et al. |
| 2020/0290237 A1* | 9/2020 | Steffens ................. B28C 5/468 |
| 2020/0291846 A1* | 9/2020 | Steffens ................. B62D 25/12 |

\* cited by examiner

HYDRAULIC AND COOLING SYSTEMS

CROSS-REFERENCE TO RELATED PATENT APPLICATIONS

This application claims the benefit of U.S. Provisional Patent Application No. 62/817,340 filed Mar. 12, 2019, which is incorporated herein by reference in its entirety.

BACKGROUND

Concrete mixer vehicles are configured to receive, mix, and transport wet concrete or a combination of ingredients that when mixed form wet concrete to a job site. Concrete mixer vehicles include a rotatable mixing drum that receives concrete poured from vehicles or from stationary facilities, such as concrete mixing plants, and mixes the concrete disposed therein. Concrete mixer vehicles may be front discharge concrete mixer vehicles or rear discharge concrete mixer vehicles, which dispense concrete from the front or rear thereof, respectively. Rear discharge concrete mixer vehicles generally feature a drum with an outlet positioned at an aft end and a cab enclosure positioned at a fore end of the concrete mixer truck. Front discharge concrete mixer vehicles include a drum with an outlet supported above the cab enclosure of the concrete mixer vehicle to discharge concrete through a chute extending forward the concrete mixer vehicle. Because front discharge concrete mixer vehicles discharge concrete at the fore end, they can be used to supply concrete to locations having limited access. Concrete mixer vehicles are typically driven by an onboard internal combustion engine.

SUMMARY

One embodiment relates to a concrete mixer vehicle. The concrete mixer vehicle includes an electronically controlled variable displacement hydraulic pump, a distribution manifold fluidly coupled to the hydraulic pump, a hydraulic fan motor coupled to a fan and fluidly coupled to the distribution manifold, an auxiliary system fluidly coupled to the distribution manifold, and a controller structured to: determine a total system demand based at least in part on a fan motor demand and an auxiliary system demand, adjust a displacement of the hydraulic pump to satisfy the total system demand, and operate the hydraulic pump at a pump speed to satisfy the total system demand.

Another embodiment relates to a system including a vehicle frame, an engine mounted to the vehicle frame, a concrete mixing drum coupled to the vehicle frame, an electronically controlled variable displacement hydraulic pump, a distribution manifold fluidly coupled to the hydraulic pump, and a cooling system that includes a cooling frame coupled to the vehicle frame, a heat exchanger coupled to the cooling frame, a fan positioned adjacent the heat exchanger toward a rear of the vehicle frame, and a hydraulic fan motor coupled to a fan and fluidly coupled to the distribution manifold. The hydraulic pump is coupled to the cooling frame. The system also includes a hydraulic drum motor in fluid communication with the distribution manifold, a load span tag axle system in fluid communication with the distribution manifold, a chute manifold in fluid communication with the distribution manifold, and a controller structured to: determine a total system demand based at least in part on a fan motor demand, a hydraulic drum motor demand, a load span tag axle system demand, and a chute manifold demand, adjust a displacement of the hydraulic pump to satisfy the total system demand, and operate the hydraulic pump at a pump speed to satisfy the total system demand.

Still another embodiment relates to a method that includes providing a pressurized hydraulic fluid from an electronically controlled variable displacement hydraulic pump to a distribution manifold, operating a hydraulic fan motor with hydraulic fluid from the distribution manifold, operating a hydraulic drum motor with hydraulic fluid from the distribution manifold, operating a load span tag axle system with hydraulic fluid from the distribution manifold, operating a chute manifold with hydraulic fluid from the distribution manifold, determining a total system demand based at least in part on a fan motor demand, a hydraulic drum motor demand, a load span tag axle system demand, and a chute manifold demand, adjusting a displacement of the hydraulic pump to satisfy the total system demand, and operating the hydraulic pump at a pump speed to satisfy the total system demand.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
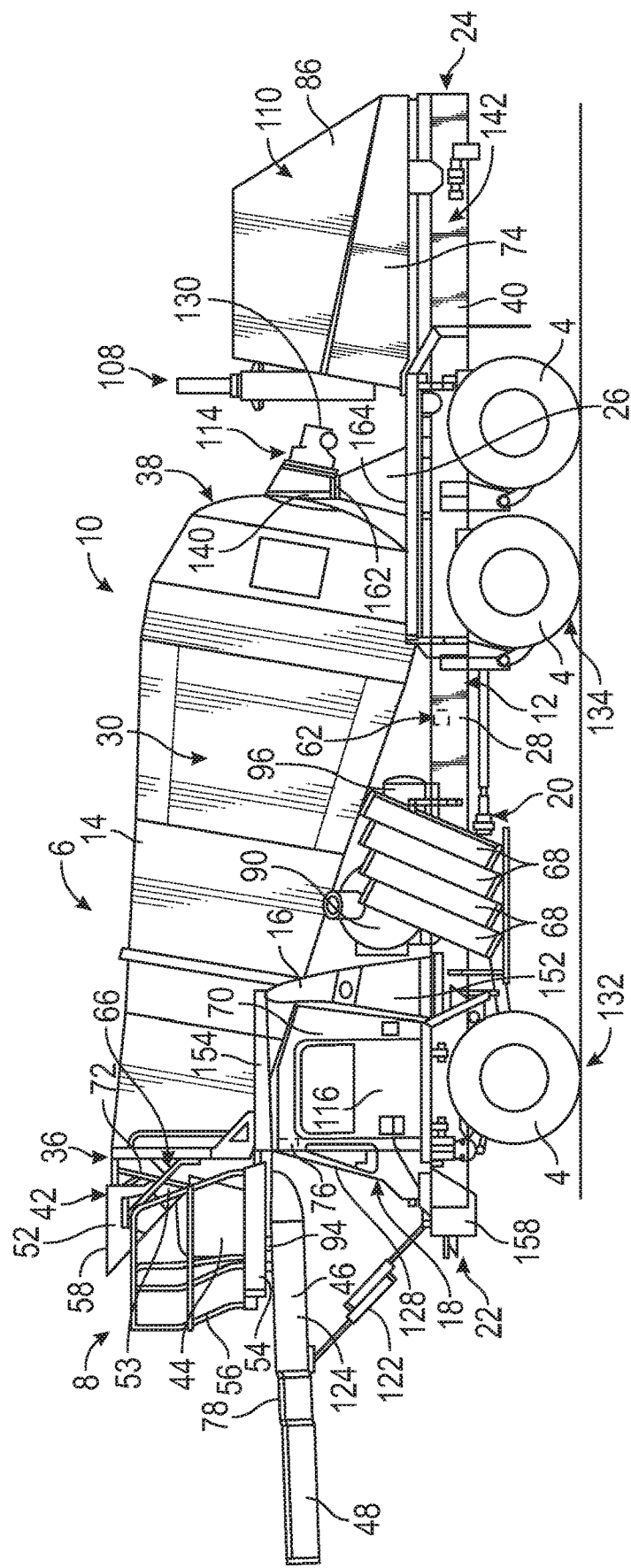
FIG. 1 is a side view of a concrete mixer truck, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a hood for the engine module with improved airflow cooling and rear accessibility of the hood and components therein is described. The hood is configured to direct airflow into the cooling system and airflow through the air cleaner. An opening on the front end of the hood includes one or more features with angles and overlapping surfaces that are configured to reduce rain intrusion into the internal portion of the hood. Beneficially, the design of the opening on the front end minimizes water into the air intake and air cleaner to reduce restriction into the air cleaner. The rear of the hood includes a hatch and hatch door with a conical internal portion and movable between an open and closed position. A grill disposed on the hatch door is configured to provide low restriction around the outer parts of the conical internal portion as the conical internal portion is where a majority of the airflow from the fan flows. A drum pump is integrated with the same structure that supports the cooling system. Beneficially, integrating the drum pump on the cooling system eliminates additional support structure(s) needed to support the drum pump in conventional systems. In some embodiments, the drum pump bolts to a lower portion of the cooling system support structure and the cooling system fan assembly is coupled to the upper portion.

According to another exemplary embodiment, a multi-function pump is configured to provide flow along multiple components to accomplish a wide variety of functions is described. Implementing the multi-function pump with a hydraulic circuit and pump control logic, the multi-function pump is able to power multiple auxiliary functions of the concrete mixer truck including any one of chute movement (e.g., rotation, raise/lower, etc.), chute folding and unfolding, providing water, driving a fan, and controlling an axle assembly. The multi-function pump is configured to reduce hydraulic complexity along the concrete mixer truck, improve hydraulic efficiency, and allows ease of installation of additional hydraulic components. In some embodiments, an electronically controlled variable displacement piston pump is utilized to allow the multi-function pump to only produce the flow/pressure as needed, thereby increasing efficiency. Additionally, as the fan is driven hydraulically, there is a large simplification of the cooling system through the elimination of the mechanical fan drive components. In some embodiments, the multi-function pump does not interact with the steering circuit to prevent the steering feel and speed of the concrete mixer truck to be impeded when the multi-function pump is powering one or more of the multiple auxiliary functions. In those embodiments, a dedicated steering pump and steering circuit may be implemented.

According to yet another exemplary embodiment, a fan assembly mounted on a rear side of the cooling system downstream of an engine is described. Conventional cooling systems utilize a pusher fan assembly mounted to the engine. Conversely, positioning the fan assembly on the back side of the cooling package improves accessibility to the cold side of the cooling cores, provides completed access to the front side of the cooling cores, and increased serviceability of the cooling system. In some embodiments, the cooling cores are mounted such that it provides complete (or near complete) access to the front side (e.g., inlet) of the cores and provides access to the rear side of the cores. Further, the front side of the core is visible for inspection when an operator is in a standing position next to the concrete mixer truck, thereby improving regular core inspection accuracy, convenience, and efficiency. Beneficially, the engine has minimal connection to the cooling package, which reduces the time needed to replace the engine in the concrete mixer truck.

Overall Vehicle

Figure 2:
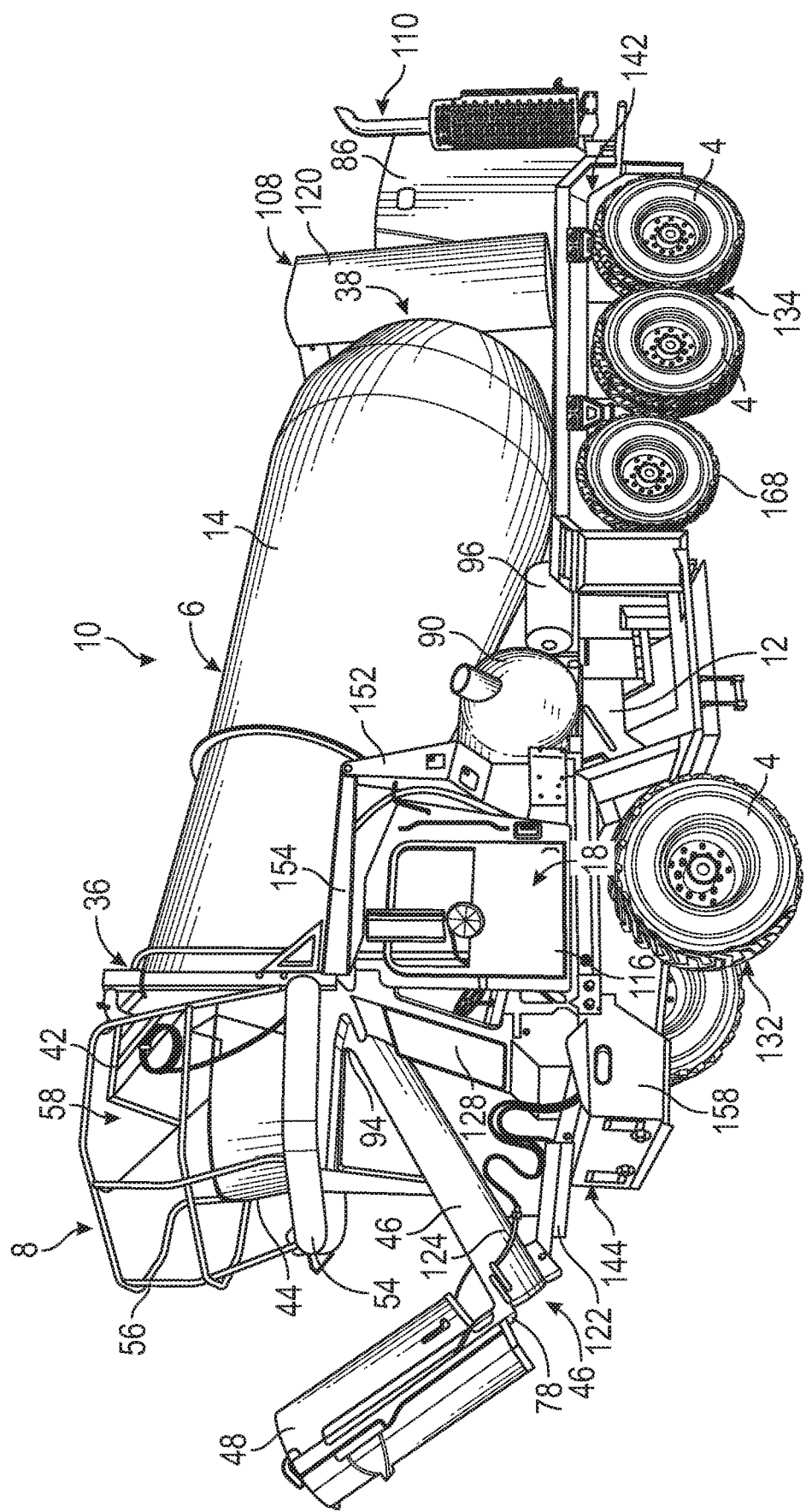
FIG. 2 is a front perspective view of the concrete mixer truck of FIG. 1.
Figure 3:
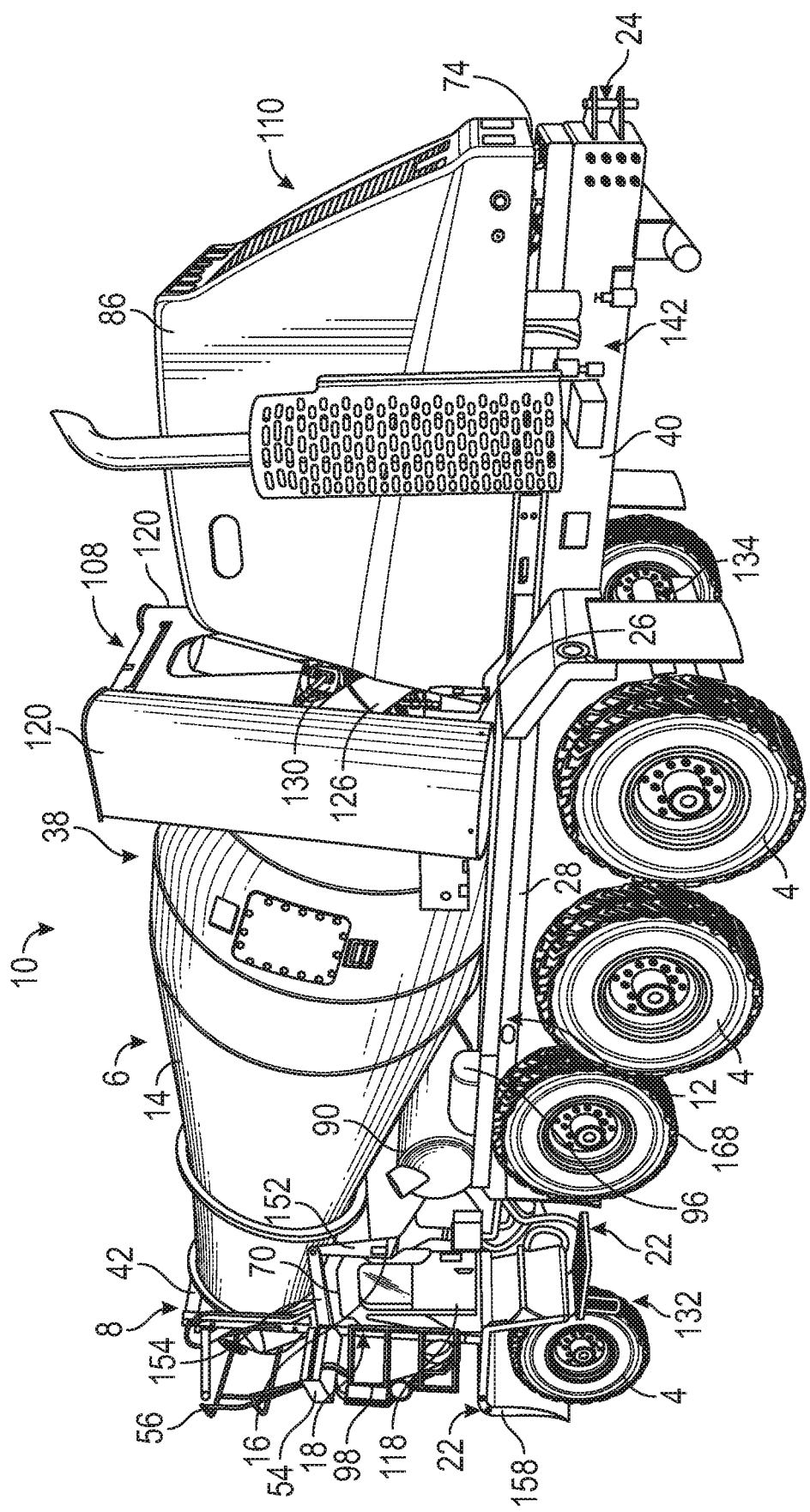
FIG. 3 is a rear perspective view of the concrete mixer truck of FIG. 1.

According to the exemplary embodiment shown in FIGS. 1-3, a vehicle, shown as concrete mixer truck 10, is configured to transport concrete from a loading location (e.g., a batching plant, etc.) to a point of use (e.g., a worksite, a construction site, etc.). In some embodiments, as shown in FIGS. 1-3, the concrete mixer truck 10 is a front discharge concrete mixer vehicle. In other embodiments, the concrete mixer truck 10 is a rear discharge concrete mixer vehicle. The concrete mixer truck 10 includes a chassis 12, a drum assembly 6, a hopper assembly 8, a drive system 20, a fuel system 108, and an engine module 110. The concrete mixer truck 10 may include various additional engine, transmission, drive, electronic, tractive assembly, braking, steering and/or suspension systems, and hydraulic systems that are configured to support the various components of the concrete mixer truck 10. Generally, the chassis 12 supports a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 are configured to facilitate receiving, mixing, transporting, and delivering concrete to a job site via the concrete mixer truck 10.

The chassis 12 includes a frame 28 that extends from a front end 22 to a rear end 24 of the concrete mixer truck 10. Wheels 4 are coupled to the frame 28 and moveably support the frame 28 above a ground surface or road. The wheels 4 may be replaced by other ground engaging motive members, such as tracks. In some embodiments, the chassis 12 includes hydraulic components (e.g., valves, filters, pipes, hoses, etc.) coupled thereto that facilitate operation and control of a hydraulic circuit including a drum drive pump and/or an accessory pump. The frame 28 provides a structural base for supporting the mixing drum 14, the front pedestal 16, the rear pedestal 26, the cab 18, and the engine module 110. In some embodiments, the frame 28 includes a widened front portion that extends over and about the wheels 4 positioned at the front end 22 of the chassis 12 to simultaneously support the cab 18 and serve as a fender for the wheels 4 positioned at the front end 22 of the chassis 12. The frame 28 may include lift eyes or other structures that facilitates lifting along the chassis 12 such that the chassis 12 can be manipulated as a subassembly for assembly and/or maintenance of the concrete mixer truck 10. One or more components may be coupled to the chassis 12 using isolating mounts made of a compliant material, such as rubber. The isolating mounts may be configured to reduce the transfer of vibrations between the components and the chassis 12.

The frame 28 includes a pair of frame rails 40 coupled with intermediate cross members, according to an exemplary embodiment. The frame rails 40 extend in a generally-horizontal and longitudinal direction (e.g., extend within ten degrees of perpendicular relative to a vertical direction, extend within ten degrees of parallel relative to a ground surface when concrete mixer truck 10 is positioned on flat ground, etc.) between the front end 22 and the rear end 24. The frame rails 40 may be elongated "C-channels" or tubular members, according to various exemplary embodiments. In other embodiments, the frame rails 40 include another type of structural element (e.g., monocoque, a hull, etc.). In still other embodiments, the frame rails 40 include a combination of elongated C-channels, tubular members, a monocoque element, and/or a hull element. A first frame rail 40 may be disposed along a first lateral side 142 and a second frame rail 40 may be disposed along a second lateral side 144, respectively, of the concrete mixer truck 10. By way of example, the first lateral side 142 of the chassis 12 may be the left side of the concrete mixer truck 10 (e.g., when an operator is sitting in the cab 18 and positioned to drive the concrete mixer truck 10, etc.) and the second lateral side 144 of the chassis 12 may be the right side of the concrete mixer truck 10 (e.g., when an operator is sitting in the cab 18 and positioned to drive the concrete mixer truck 10, etc.).

The cab 18 is coupled to the frame rails 40 proximate the front end 22 of the chassis 12. According to various embodiments, the cab 18 (e.g., operator cabin, front cabin, etc.) is configured to house one or more operators during operation of the concrete mixer truck 10 (e.g., when driving, when dispensing concrete, etc.), and may include various components that facilitate operation and occupancy of the concrete mixer truck 10 (e.g., one or more seats, a steering wheel, control panels, screens, joysticks, buttons, accelerator, brake, gear lever, etc.). The cab 18 includes a housing 70 that forms the structure of the cab 18. At least one door 116 is affixed to the housing 70 to allow an operator to enter and exit the cab 18. A windshield 128 is disposed along a front side of the housing 70, near the front end 22, and above a front bumper 158 of the concrete mixer truck 10. The windshield 128 is configured to provide visibility to the operator while driving the concrete mixer truck 10, operating a main chute 46, and completing other tasks. The front bumper 158 may be affixed to a bottom portion of the housing 70. In some embodiments, the front bumper 158 is affixed to the frame 28 at the front end 22 of the concrete mixer truck 10.

A control assembly 76 is disposed within the cab 18 and is configured to control one or more components of the concrete mixer truck 10. The control assembly 76 may include controls, buttons, joysticks, and other features that control the movement and orientation of the concrete mixer truck 10, the hopper assembly 8, the main chute 46, a charge hopper 42, a discharge hopper 44, the mixing drum 14, and/or other components of the concrete mixer truck 10. For example, the control assembly 76 may include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 includes a user interface with a display and an operator input. The display may be configured to display a graphical user interface, an image, an icon, or still other information. In one embodiment, the display includes a graphical user interface configured to provide general information about the concrete mixer truck 10 (e.g., vehicle speed, fuel level, warning lights, etc.). The graphical user interface may also be configured to display a current mode of operation, various potential modes of operation, or still other information relating to a transmission, modules, the drive system 20, and/or other components of the concrete mixer truck 10.

An air tank 96 is coupled to and supported by the chassis 12 and positioned directly beneath the mixing drum 14. The air tank 96 is configured to store compressed air (e.g., for use in an air brake system, for use when raising and lowering a pusher axle assembly, etc.). A water tank 90 extends laterally across the length of the chassis 12, forward of the air tank 96. The water tank 90 is coupled to the frame rails 40 and positioned beneath the mixing drum 14. The water tank 90 may be used to supply water to wash the concrete mixer truck 10 after pouring a concrete load and/or to add water to the concrete within the mixing drum 14 at the construction site and/or during transit, among other uses.

The drum assembly 6 is configured to store, mix and dispense concrete. The drum assembly 6 includes the mixing drum 14, a drum driver 114, and the hopper assembly 8. The mixing drum 14 extends longitudinally along a majority of the length of the concrete mixer truck 10 and may be angled relative to the frame rails 40 (e.g., when viewed from the side of the concrete mixer truck 10). The mixing drum 14 has a first end 36 that is positioned toward the front end 22 of the concrete mixer truck 10 and coupled to the front pedestal 16 (e.g., support post, support column, etc.). The first end 36 may at least partially extend over the cab 18. The first end 36 defines a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 has a second end 38 that is positioned toward the rear end 24 of the concrete mixer truck 10 and coupled to the rear pedestal 26 (e.g., support post, support column, etc.). The mixing drum 14 may be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 may be a part of a superstructure of the concrete mixer truck 10. The superstructure further includes the frame 28 and the chassis 12. In other embodiments, the mixing drum 14 is otherwise coupled to the frame rails 40. Although the concrete mixer truck 10 illustrated in FIGS. 1-3 is a front discharge concrete mixer vehicle, it is to be understood that in other embodiments the concrete mixer truck 10 may include a drum assembly 6 having any other discharge arrangement (e.g., rear discharge).

The front pedestal 16 includes an upper portion 152 and a lower portion 154. The upper portion 152 is coupled to and supports the hopper assembly 8. The lower portion 154 is coupled to the frame rails 40 and supports the upper portion 152 of the front pedestal 16 and the first end 36 of the mixing drum 14. The rear pedestal 26 includes an upper portion 162 and a lower portion 164. The lower portion 164 is coupled to the frame rails 40 and supports the upper portion 162. The upper portion 162 supports a bottom interface of a drum drive transmission 140 (e.g., a bottom portion of the housing thereof) and/or the second end 38 of the mixing drum 14. In some embodiments, the rear pedestal 26 includes a pair of legs extending between the frame rails 40 and the drum drive transmission 140.

The drum opening 72 at the first end 36 of the mixing drum 14 is configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 may include a mixing element (e.g., fins, etc.) positioned within the internal volume 30. The mixing element may be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the concrete mixer truck 10, the mixing elements of the mixing drum 14 are configured to agitate the contents of a mixture located within the internal volume 30 of the mixing drum 14 as the mixing drum 14 is rotated in a counterclockwise and/or a clockwise direction by the drum driver 114.

The drum driver 114 is configured to provide an input (e.g., a torque, etc.) to the mixing drum 14 to rotate the mixing drum 14 relative to the chassis 12. The drum driver 114 may be configured to selectively rotate the mixing drum 14 clockwise or counterclockwise, depending on the mode of operation of the concrete mixer truck 10 (i.e., whether concrete is being mixed or dispensed). The drum driver 114 is coupled to a rear or base portion of the second end 38 of the mixing drum 14 and a top end of the lower portion 164 and/or a lower end of the upper portion 162 of the rear pedestal 26. The drum driver 114 includes a transmission, shown as drum drive transmission 140, and a driver, shown as drum drive motor 130, coupled to drum drive transmission 140. The drum drive transmission 140 extends rearward (e.g., toward the rear end 24 of the concrete mixer truck 10, toward the engine module 110, etc.) from the second end 38 of the mixing drum 14 and the drum drive motor 130 extends rearward from the drum drive transmission 140. In some embodiments, the drum drive motor 130 is a hydraulic motor. In other embodiments, the drum drive motor 130 is another type of actuator (e.g., an electric motor, etc.). The drum drive motor 130 is configured to provide an output torque to the drum drive transmission 140, according to an exemplary embodiment, which rotates the mixing drum 14 about a rotation axis. The drum drive transmission 140 may include a plurality of gears (e.g., a planetary gear reduction set, etc.) configured to increase the turning torque applied to the mixing drum 14, according to an exemplary embodiment. The plurality of gears may be disposed within a housing. In some embodiments, a drum drive pump and/or accessory pump may be configured to receive rotational mechanical energy and output a flow of pressurized hydraulic fluid to drive one or more components of the concrete mixer truck 10.

The hopper assembly 8 is positioned at the drum opening 72 of the mixing drum 14. The hopper assembly 8 is configured to introduce materials into and allow the materials to flow out of the internal volume 30 of the mixing drum 14 of the concrete mixer truck 10. The hopper assembly 8 is configured to prevent loss of material or spillage when the material enters and exits the mixing drum 14. The hopper assembly 8 includes the charge hopper 42, the discharge hopper 44, a hopper actuator 66, a platform 54, and the main chute 46, which are positioned above at least partially forward of the cab 18 of the concrete mixer truck 10. The charge hopper 42 is configured to direct the materials (e.g., cement precursor materials, etc.) into the drum opening 72 of the mixing drum 14. The discharge hopper 44 is configured to dispense mixed concrete from the internal volume 30 of the mixing drum 14 to the main chute 46 and, ultimately, the desired location.

The platform 54 includes a perforated surface that surrounds the charge hopper 42 and the discharge hopper 44. In some embodiments, the platform 54 includes an asymmetric base. The platform 54 includes platform sides extending beneath the perforated surface. A guardrail 56 is coupled to the platform 54 and follows the contour of a periphery of the platform 54. The platform 54 is situated at a position near the drum opening 72 of the mixing drum 14 to facilitate access by the operator to the drum opening 72, the internal volume 30, the charge hopper 42, the discharge hopper 44, and/or the main chute 46. In some embodiments, the concrete mixer truck 10 includes a ladder 98 that extends downward from a side of the platform 54 to allow an operator to climb and reach the platform 54.

The charge hopper 42 includes a first portion 52 that is configured to receive materials during a charging/loading operation. The first portion 52 has a rim 58 (e.g., opening) formed at a free end of the first portion 52. The charge hopper 42 includes a second portion 53 aligned with the bottom of the first portion 52. According to an exemplary embodiment, the charge hopper 42 is selectively repositionable/movable. In some embodiments, the charge hopper 42 is configured to rotate about a horizontal, lateral axis. In some embodiments, the charge hopper 42 is configured to raise and lower vertically. Specifically, the charge hopper 42 is configured to lift, pivot, or otherwise move between a first position (e.g., a lowered position, loading position, a charging position, etc.) and a second position (e.g., a raised position, a dispensing position, a pivoted position, etc.) above or shifted from the first position. In the first position, the charge hopper 42 is configured to direct material (e.g., concrete, etc.) from a source positioned above the concrete mixer truck 10 (e.g., a batch plant, etc.) through the drum opening 72 and into the internal volume 30 of the mixing drum 14. The first position may also facilitate transport of the concrete mixer truck 10 by lowering the overall height of the concrete mixer truck 10. In the second position, the charge hopper 42 moves (e.g., lifts, pivots, etc.) away from the drum opening 72 and facilitates material flowing unobstructed out of the drum opening 72 and into the discharge hopper 44 and the main chute 46.

A hopper actuator 66 is positioned to move the charge hopper 42 between the first position and the second position. The hopper actuator 66 facilitates selectively controlling movement of the charge hopper 42 between the first position and the second position. The hopper actuator 66 is coupled to and extends between the charge hopper 42 and the platform 54. In some embodiments, the hopper actuator 66 is a hydraulic cylinder. In other embodiments, the hopper actuator 66 is another type of actuator (e.g., a pneumatic cylinder, a lead screw driven by an electric motor, an electric motor, etc.).

When receiving the material, the charge hopper 42 may be in the first position and the main chute 46 may be in a first configuration (e.g., a transport configuration, a stored configuration, etc.). Accordingly, material can be deposited into the charge hopper 42, and the charge hopper 42 directs the material into the internal volume 30 of the mixing drum 14 through the drum opening 72. While material is being added to the mixing drum 14, the drum driver 114 may be operated to drive the mixing drum 14 to agitate the material and facilitate fully loading/packing the mixing drum 14. Alternatively, the mixing drum 14 may be stationary while material is added to the mixing drum 14. When discharging and the charge hopper 42 is in the second position, the discharge hopper 44 funnels material from the mixing drum 14 into the main chute 46.

The main chute 46 functions as an outlet of the mixing drum 14 and is used to direct concrete dispensed from the internal volume 30 of the mixing drum 14 and through the discharge hopper 44 to a target location near the concrete mixer truck 10. The main chute 46 is pivotally coupled to the platform 54 and/or the discharge hopper 44, such that the main chute 46 is configured to rotate about both a vertical axis and a horizontal axis. The main chute 46 includes a base section 124 that may be pivotally coupled to the platform 54 and/or the discharge hopper 44. An extension chute 48 (e.g., a folding section, a second chute section, etc.) is pivotally coupled to the distal end of the base section 124. In some embodiments, a plurality of extension chutes 48 are pivotally connected to one another. One or more removable/detachable extension chutes 68 may be selectively coupled to the distal end of the extension chute 48. The main chute 46 is selectively reconfigurable between a first configuration (e.g., a storage configuration, a transport configuration, etc.) and a second configuration (e.g., a use configuration, a dispensing configuration, etc.). In the first configuration, (i) the base section 124 may be selectively oriented substantially horizontal and extending laterally outward, (ii) the extension chute 48 may be selectively pivoted relative to the base section 124 and extending substantially vertically, and (iii) the removable extension chutes 68 may be removed from the extension chute 48 and stored elsewhere in the concrete mixer truck 10 (e.g., coupled to the chassis 12 beneath the mixing drum 14, etc.). In the first configuration, the main chute 46 may, therefore, minimally obscures the view of an operator positioned within the cab 18. In the second configuration, (i) the extension chute 48 may be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 may be coupled to the distal end of the extension chute 48 to increase the length of the main chute 46 (e.g., to distribute concrete further away from the concrete mixer truck 10, etc.).

A first chute actuator 122 (e.g., a chute raising/lowering actuator, etc.) is coupled to and extends between the main chute 46 (e.g., a distal end thereof, etc.) and the chassis 12. In some embodiments, the first chute actuator 122 extends between the main chute 46 and the front bumper 158. The first chute actuator 122 is configured to raise and lower the main chute 46 to control the orientation of the main chute 46 relative to a horizontal plane (e.g., the ground, etc.). In some embodiments, the first chute actuator 122 is a pair of opposing hydraulic cylinders. In other embodiments, the first chute actuator 122 is another type of actuator (e.g., a pneumatic cylinder, a lead screw driven by an electric motor, a single hydraulic cylinder, etc.). In some embodiments, the first chute actuator 122 and the main chute 46 are both configured to rotate about the same or substantially the same vertical axis (e.g., as the main chute 46 is pivoted about the vertical axis as described in more detail herein).

A second chute actuator 94 (e.g., a chute pivot/rotation actuator, etc.) is coupled to the base section 124 of the main chute 46 and the platform 54. The second chute actuator 94 is configured to rotate the main chute 46 about a vertical axis. The second chute actuator 94 is configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 is a hydraulic motor. In other embodiments, the second chute actuator 94 is another type of actuator (e.g., a pneumatic motor, an electric motor, etc.).

A third chute actuator 78 (e.g., a chute folding/unfolding actuator, etc.) is configured to reposition (e.g., extend and retract, fold and unfold, etc.) the extension chute 48 relative to the base section 124 of the main chute 46. The third chute actuators 78 may be coupled to and extend between the base section 124 and the extension chute 48. In some embodiments, the third chute actuator 78 includes a plurality of actuators positioned to reposition a first extension chute 48 relative to the base section 124 and one or more second extension chutes 48 relative to the first extension chute 48. The first chute actuator 78, the second chute actuator 94, and the third chute actuator 78 facilitate selectively reconfiguring the main chute 46 between the first configuration and the second configuration. In some embodiments, a controller (e.g., joystick) is configured to facilitate providing commands to control operation of the first chute actuator 122, the second chute actuator 94, and the third chute actuator 78 to direct the main chute 46 and concrete flow therefrom. In some embodiments, a hopper pump may be coupled to the chassis 12 and configured to provide pressurized hydraulic fluid to power the first chute actuator 122, the second chute actuator 94, and/or the third chute actuator 78. The hopper pump may be a variable displacement pump or a fixed displacement pump. Additionally or alternatively, a pneumatic pump and/or an electrical storage and/or generation device is used to power one or more of the first chute actuator 122, the second chute actuator 94, and/or the third chute actuator 78.

Once at the job site, the concrete mixer truck 10 may be configured to dispense the material to a desired location (e.g., into a form, onto the ground, etc.). The charge hopper 42 may be repositioned into the second position from the first position by the hopper actuator 66. The extension chute(s) 48 may be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator can control the drum driver 114 to rotate the mixing drum 14 in the second direction, expelling the material through the drum opening 72, into the discharge hopper 44, and into the main chute 46. The operator may control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the concrete mixer truck 10.

The drive system 20 is configured to propel the concrete mixer truck 10 and may drive other systems of the concrete mixer truck 10 (e.g., the drum driver 114, etc.). The drive system 20 includes driven tractive assemblies that include a front axle assembly 132 and a pair of rear axle assemblies 134, each coupled to various wheels 4. In some embodiments, the drive system 20 includes a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the concrete mixer truck 10. In some embodiments, a pusher axle assembly 168 (e.g., tag axle assembly, auxiliary system, etc.) is configured to be raised and lowered to selectively engage the support surface (e.g., based on the loading of the concrete mixer truck 10, etc.). Such a configuration distributes the pressure exerted on the ground by the concrete mixer truck 10, which may be required, for example, when traveling through certain municipalities under load.

The power plant module 62 (e.g., prime mover module, driver module, etc.) is configured to supply rotational mechanical energy to drive the concrete mixer truck 10. The power plant module 62 is coupled to the chassis 12 and positioned near the longitudinal center of the concrete mixer truck 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device are integrated into a single device (e.g., an electromechanical infinitely variable transmission, an electromechanical transmission, etc.). The electromagnetic device is configured to provide a mechanical energy input to the transmission. By way of example, the electromagnetic device may be configured to supply a rotational mechanical energy input to the transmission (e.g., using electrical energy generated from the mechanical power input provided by the engine module 110, etc.). In some embodiments, the power plant module 62 and/or the drive system 20 includes additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 is configured to provide fuel to the engine module 110 and/or other components of the concrete mixer truck 10. Specifically, the fuel system 108 may be configured to provide fuel to an engine 74 of the engine module 110. The engine 74 may use the fuel in an internal combustion process to generate a mechanical power output that is provided to the power plant module 62 (e.g., to generate electricity, to power onboard electric motors used to rotate wheel and tire assemblies, to drive the transmission, etc.) and/or to power the drum driver 114. The fuel system 108 may include one or more valves, hoses, regulators, filters, and/or various other components configured to facilitate providing fuel to the engine 74. The fuel system 108 includes a container 126 (e.g., a vessel, reservoir, tank, etc.) that is configured to store a fluid (e.g., fuel, air, hydraulic fluid, etc.). The container 126 is disposed behind the drum driver 114 along the chassis 12. In other embodiments, the container 126 is coupled to a side of the rear pedestal 26. In some embodiments, the container 126 is coupled to the chassis 12 and positioned directly beneath the mixing drum 14. According to an exemplary embodiment, the container 126 includes a fuel tank that stores fuel used to power the engine 74. In some embodiments, the container 126 additionally or alternatively includes an air tank configured to store compressed air (e.g., for use in an air brake system, for use when raising and lowering the pusher axle assembly 168, etc.). In some embodiments, the container 126 additionally or alternatively includes a hydraulic tank configured to store hydraulic fluid for use in one or more hydraulic circuits (e.g., a hydraulic circuit that includes the drum driver 114, etc.).

A cover assembly 120 including a plurality of cover panels is positioned between the second end 38 of the mixing drum 14 and the engine module 110. The cover assembly 120 is disposed around the fuel system 108 (e.g., the container 126, etc.), the drum driver 114, and the rear pedestal 26. The cover assembly 120 is configured to protect the various internal components from debris. Such debris may be encountered while the concrete mixer truck 10 is driven along a roadway, for example. The cover assembly 120 may also protect the various internal components from damage due to collisions with trees, poles, or other structures at a jobsite or while transporting concrete. In some embodiments, all or some of the fuel system 108 is incorporated under a hood 86 of the engine module 110.

The engine module 110 is coupled to the frame rails 40 proximate the rear end 24 of the chassis 12. The engine module 110 is configured to directly, or indirectly, supply the various components of the concrete mixer truck 10 with the power needed to operate the concrete mixer truck 10. By way of example, the engine module 110 may be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 may be defined by any number of different types of power sources. According to an exemplary embodiment, the engine module 110 includes the engine 74 coupled to the frame rails 40 and disposed within the hood 86. The engine 74 may include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 is electrically driven (i.e., powered using electrical energy) rather than hydraulically driven.

In some embodiments, the engine module 110 additionally or alternatively includes multiple battery modules (e.g., batteries, capacitors, ultra-capacitors, etc.) spread throughout the concrete mixer truck 10, which cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the concrete mixer truck 10 is a purely electric vehicle that does not include an internal combustion engine and, as such, is driven by electrical energy in all modes of operation. In such embodiments, the concrete mixer truck 10 may not include a fuel tank.

Cooling System

Figure 4:
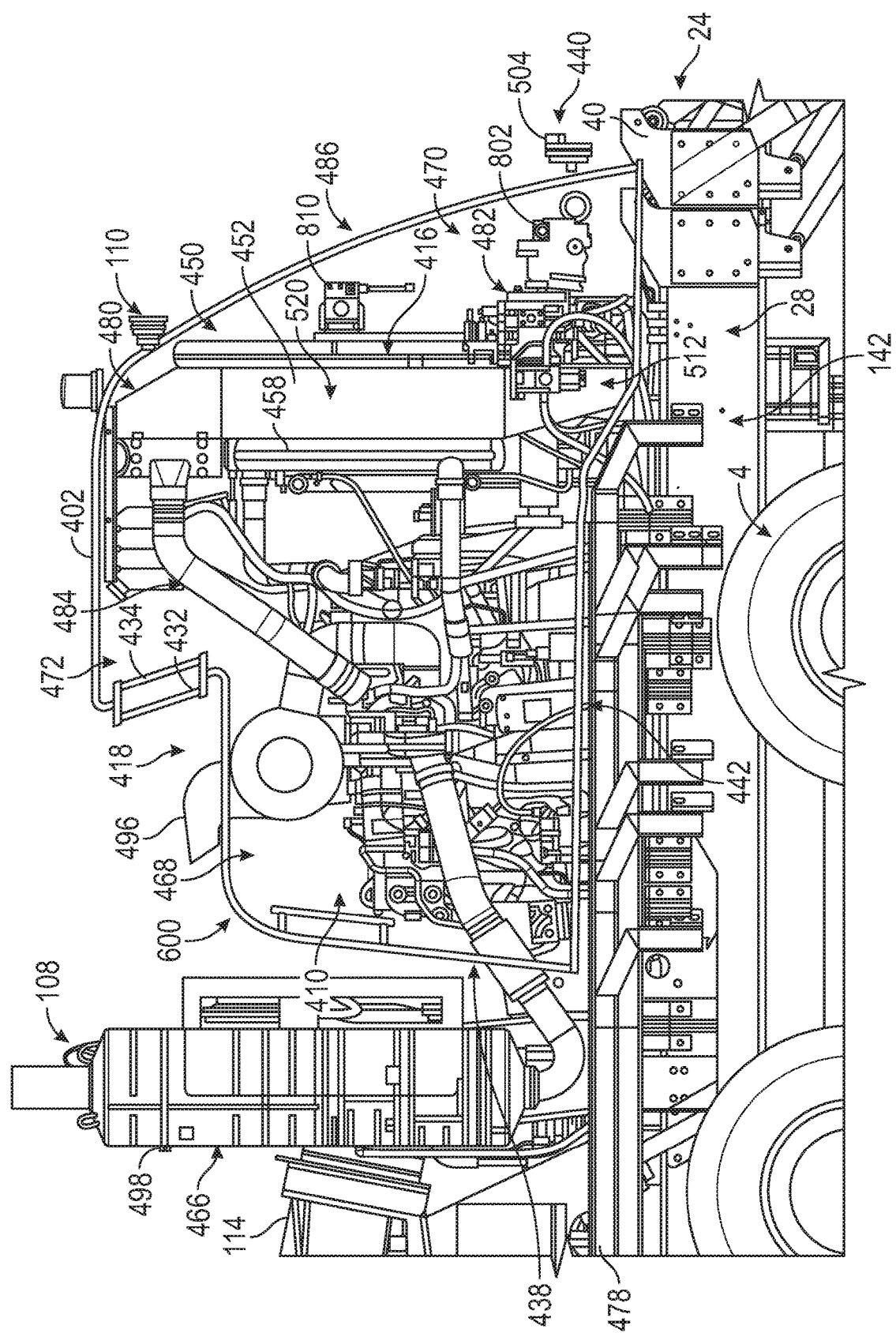
FIG. 4 is a perspective view of a concrete mixer truck with a hood design and cooling system, according to an example embodiment.
Figure 5:
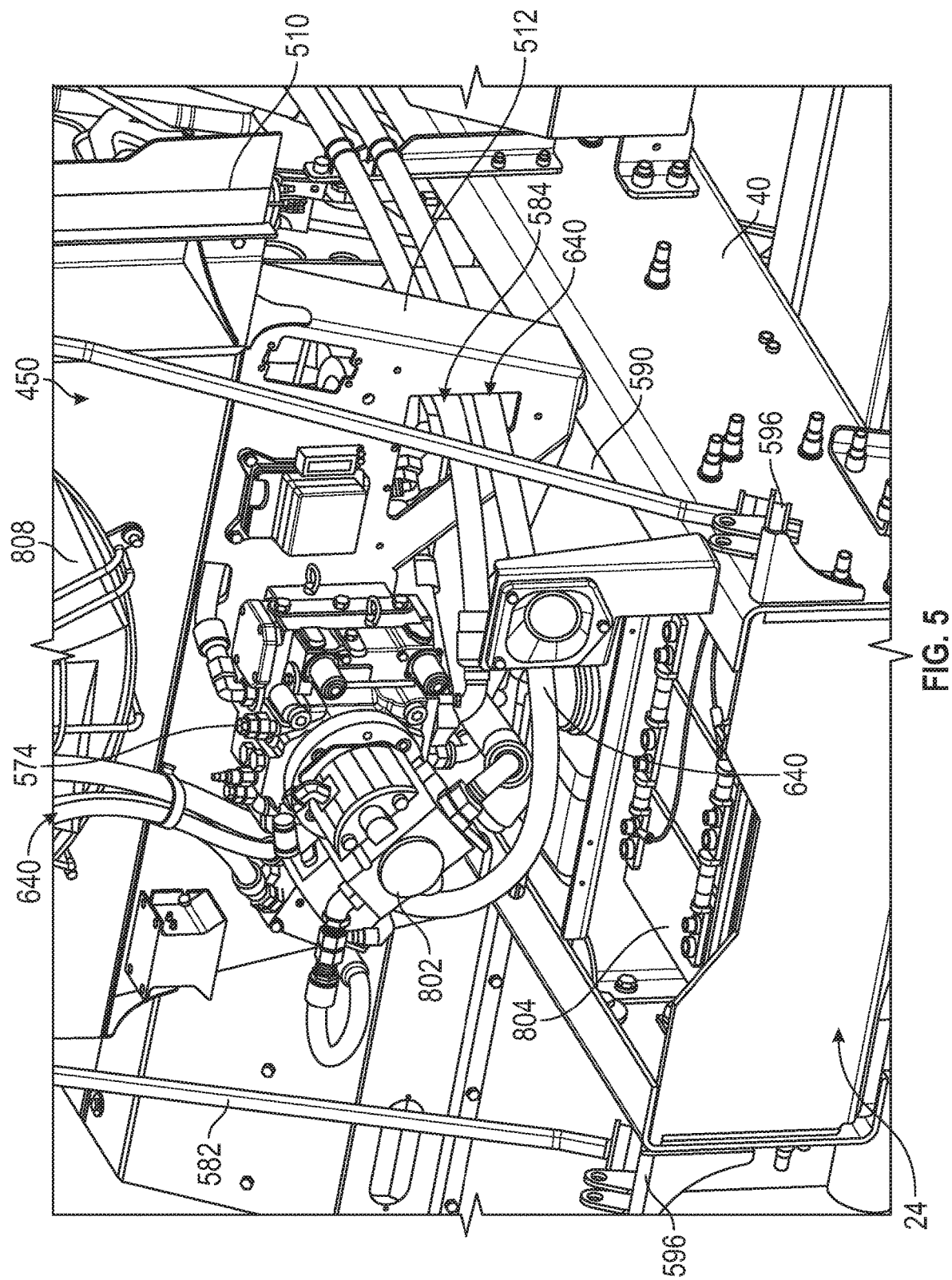
FIG. 5 is a rear perspective view of the cooling system and drum pump of FIG. 4.
Figure 6:
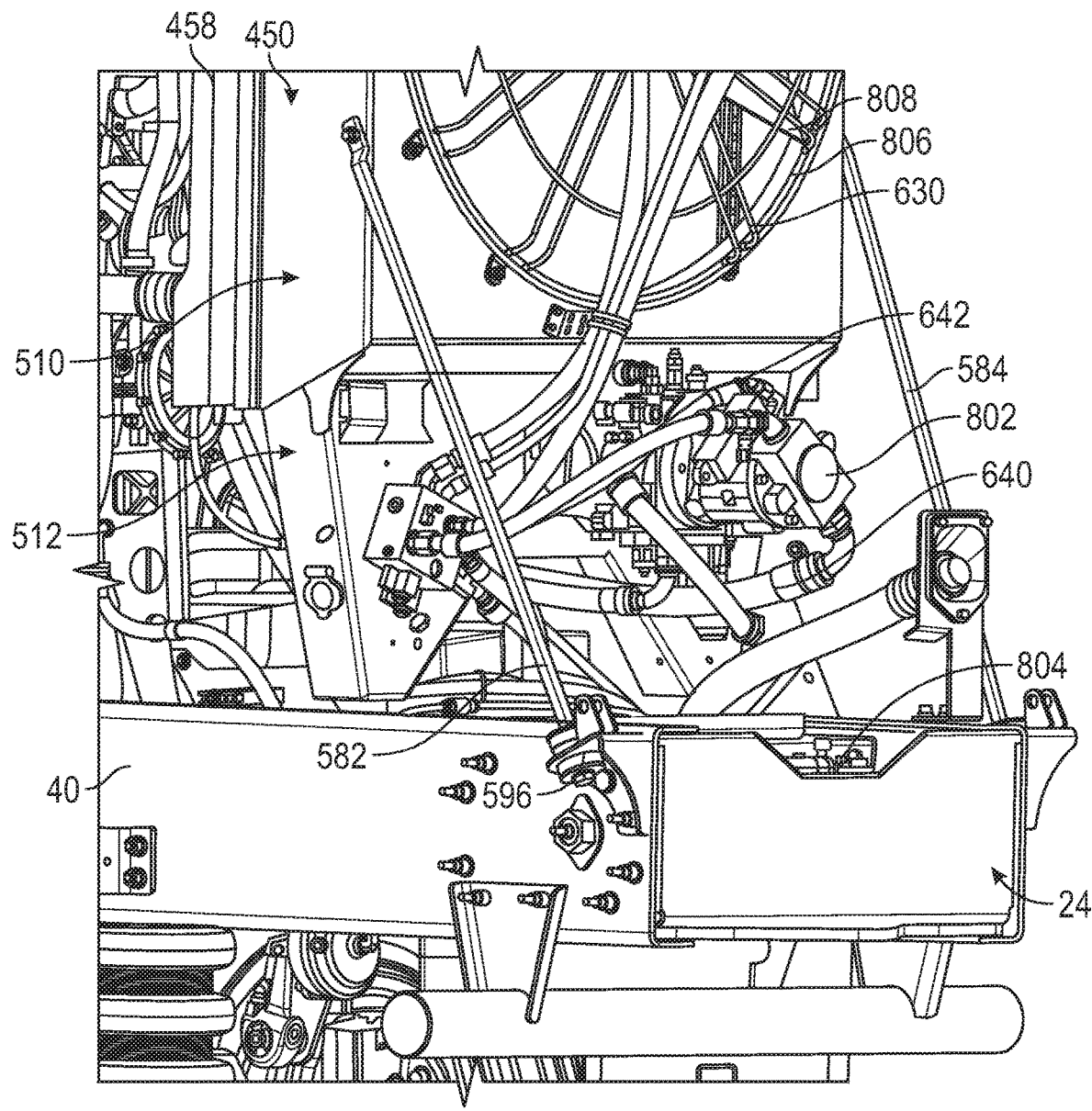
FIG. 6 is a rear perspective view of the cooling system and drum pump of FIG. 4.

Referring to FIGS. 4-6, the engine module 110 includes an engine 474 (e.g., prime mover), a cooling system 480, and a fan assembly 450. The cooling system 480 includes a pump 802 coupled to a cooling frame 452 and the fan assembly 450. In some embodiments, the fan assembly 450 is coupled to a cooling frame upper portion 510 and the pump 802 is coupled to a cooling frame lower portion 512. The cooling system 480 and the pump 802 are disposed along the frame rails 40 and in an internal hood cavity 410 of a hood 486 that provides cooling via an improved airflow 600 and rear accessibility through a hatch 420 (see FIG. 17). As shown in FIG. 4, the hood 486 is coupled to the frame rails 40 and/or other portions of the chassis 12 and is configured to cover and protect the engine module 110. The hood 486 includes a hood frame 402, a front hood end 438, a rear hood end 440 adjacent the rear end 24, a first hood side 442 adjacent the first lateral side 142, and a second hood side 444 adjacent the second lateral side 144. The hood frame 402 includes a lower frame portion 414 and an upper frame portion above the lower frame portion 414 and an outer cavity 418 formed on the front hood end 438. The front hood end 438 is downstream of the second end 38 of the mixing drum 14 such that air flow 600 moves along the top and sides of the mixing drum 14 toward the front hood end 438. A plurality of cavities are formed throughout the internal hood cavity 410 of the hood 486 by the various components and form airflow conduits and/or paths. A front cavity 469 is formed between the front hood end 438, the engine 474, and the top portion of the lower frame portion 414. An upper cavity 472 is disposed between the engine 474 and fan assembly 450 in the upper frame portion 412. A rear cavity 470 is disposed downstream of the fan assembly 450 and upstream of a hatch door 422 of the hatch 420. The air flow 600 may enter through the front hood end 438 and travel through any one of the front cavity 468, upper cavity 472, and rear cavity 470 as the air flow 600 travels through the hood 486 toward the rear hood end 440.

The engine 474 is connected to and powered by a fuel tank 498 of the fuel system 108. The fuel tank 498 is configured to provide fuel to the engine 474. In some embodiments, the engine 474 is a plurality of batteries for an electronic concrete mixer truck 10. The cooling system 480 is configured to thermally regulate (e.g., cool, etc.) the engine 474. In some embodiments, the cooling system 480 may absorb thermal energy from the engine 474 and transport the thermal energy to another location where it can be disseminated to the surrounding environment. The cooling system 480 includes a plurality of controllers 482, a hydraulic pump 464, a radiator 458, and a plurality of conduits 484. In some embodiments, the engine 474 includes an aftertreatment system including a DEF tank positioned downstream of the engine 474 and upstream of an engine exhaust 496. The DEF tank is configured to provide a consumable in selective catalytic reduction (SCR) that lowers NOx concentration in the diesel exhaust emissions from the engine 474.

The plurality of conduits 484 (e.g., fluid conduits) extend from the engine 474 to the radiator 458 and are configured to deliver fluid cooled by the radiator to the engine 474 and/or thermally regulate the engine 474. In some embodiments, the plurality of conduits 484 are configured to deliver coolant from one or more tanks to the engine 474. For example, a coolant circuit includes a thermal energy interface (e.g., water jacket) and is configured to transfer thermal energy from the engine 474 into the coolant and move the heated coolant through the plurality of conduits 484. The controllers 482 include control valves, power providers, and electronics. In some embodiments, one or more control valves are configured to regulate and/or control the flow of pressurized hydraulic fluid within the fan assembly 450. In some embodiments, the control valves may include check valves, relief valves, flow control valves, directional control valves, or other types of valves and may be passively controlled. An electronic controller of the controllers 482 may be actively controlled by an operator through a lever, switch, or dial, electronically by the controller, by a pneumatic or hydraulic pilot pressure controlled by the controller, or similar electronic control mechanisms. By way of example, the fan assembly 450 may include flow control valves and/or pressure control valves that control the flow hydraulic fluid to the fan motor 810 and thereby control the speed and/or torque of the fan motor 810. By way of another example, the control valves may include a pressure relief valve that extends across the inlet and the outlet of the fan motor 810 to reduce line pressure if the fan motor 810 is ever backdriven.

The radiator 458, or similar heat exchanger, is configured to receive incoming air through the front hood end 438 to reduce the temperature of a fluid (e.g., coolant, etc.) within the cooling system 480 and thereby cool the engine 474. The heated air then disperses (e.g., through forced or natural convection, etc.), transferring the thermal energy to the surrounding environment. The radiator 458 is thermally conductive and has a large surface area (e.g., formed through a number of fins, etc.). In some embodiments, the radiator 458 may be liquid-cooled, rather than air-cooled. An air cleaner 462 is positioned upstream of the fan 416 and is configured to clean air as it flows through the fan 416. In some embodiments, the air cleaner 462 is positioned downstream of the fan 416.

Figure 8:
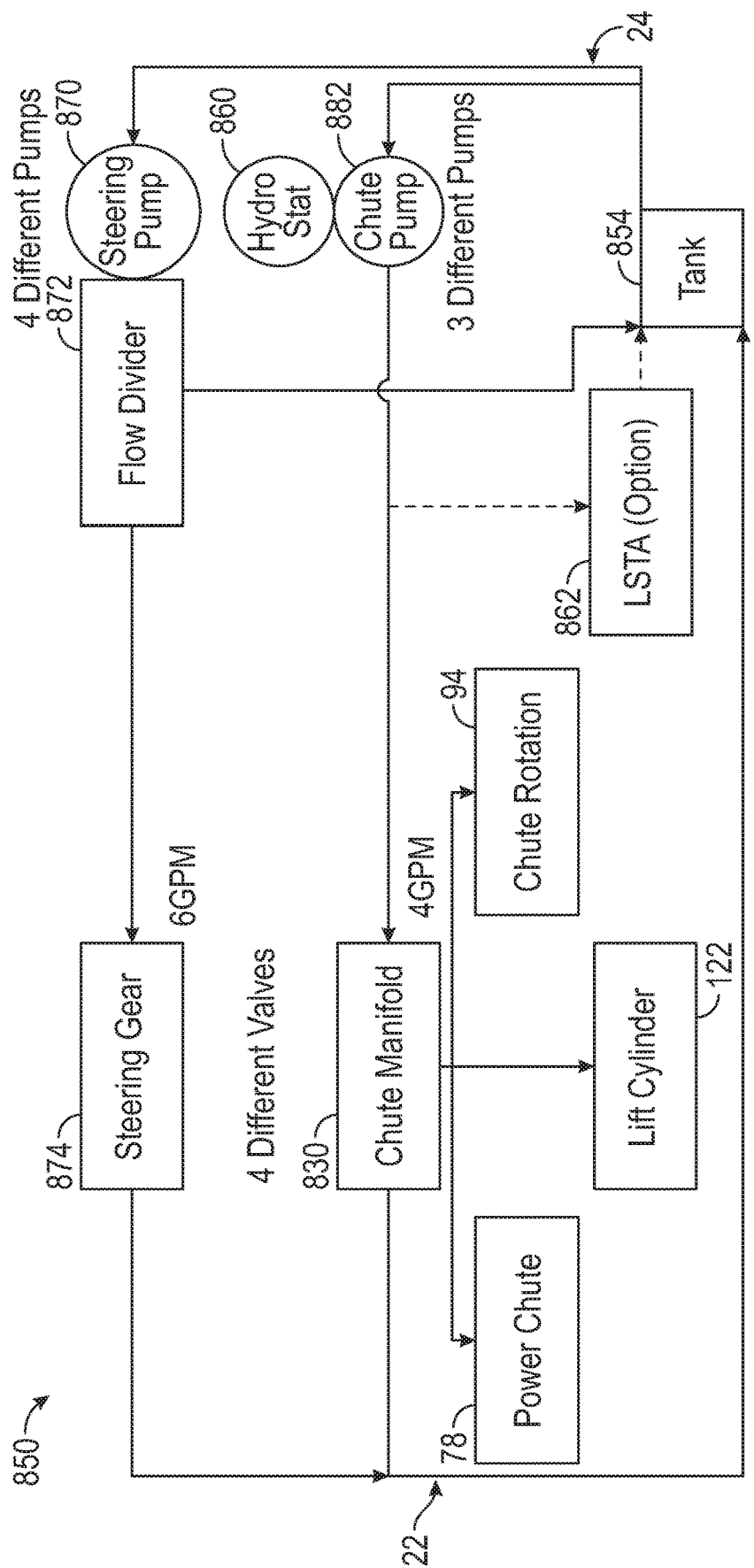
FIG. 8 is a system flow diagram of a conventional hydraulic circuit design and control logic, according to an example embodiment.

The fan assembly 450, or similar driver configured to draw incoming air 600 through the radiator 458, is downstream of the cooling system 480. The fan assembly 450 is disposed on the cooling frame 452 and includes a fan 416, a fan motor 810, a fan ring 806, fan blades 808, and a fan grill 630 to protect other components from the rotating fan blades 808. As shown in FIG. 8, a plurality of fan coupling members 812 couple the fan ring 806 to the internal portion of the hood 486. A fan motor 810 is operably connected to the fan 416 and is configured to drive the fan 416 to rotate the fan blades 808. The fan ring 806 is configured to receive a conical internal portion 700 on the hatch door 422 of the hatch 420. Beneficially, the conical internal portion 700 is configured to direct hot air out of the hood 486 from the fan 416 rearward, or slightly upward to not disturb dust on the ground outside of the concrete mixer truck 10, to reduce recirculation and improve efficiency of the airflow 600 in the hood 486. Further, the configuration of the conical internal portion 700 provides for reduced fan speed for properly cool the engine module 110. The outlet of the hydraulic pump 464 may be fluidly coupled (e.g., indirectly or indirectly) to a hydraulic motor, shown as fan motor 810. Accordingly, the flow of pressurized hydraulic fluid from the hydraulic pump 464 drives the fan motor 810. After exiting the fan motor 810, the hydraulic fluid returns to the tank 466. An output shaft of the fan motor 810 is coupled to an air mover, shown as fan 416. The fan 416 is positioned adjacent the radiator 458 such that rotation of the fan motor 810 causes the fan 416 to pull air through the radiator 458, cooling the coolant flowing therethrough. As shown in FIG. 4, the fan 416 is positioned rearward of the radiator 458. In other embodiments, the fan 416 is positioned forward of the radiator 458 or positioned remotely from the radiator 458 and fluidly coupled to the radiator 458 through one or more ducts.

Figure 7:
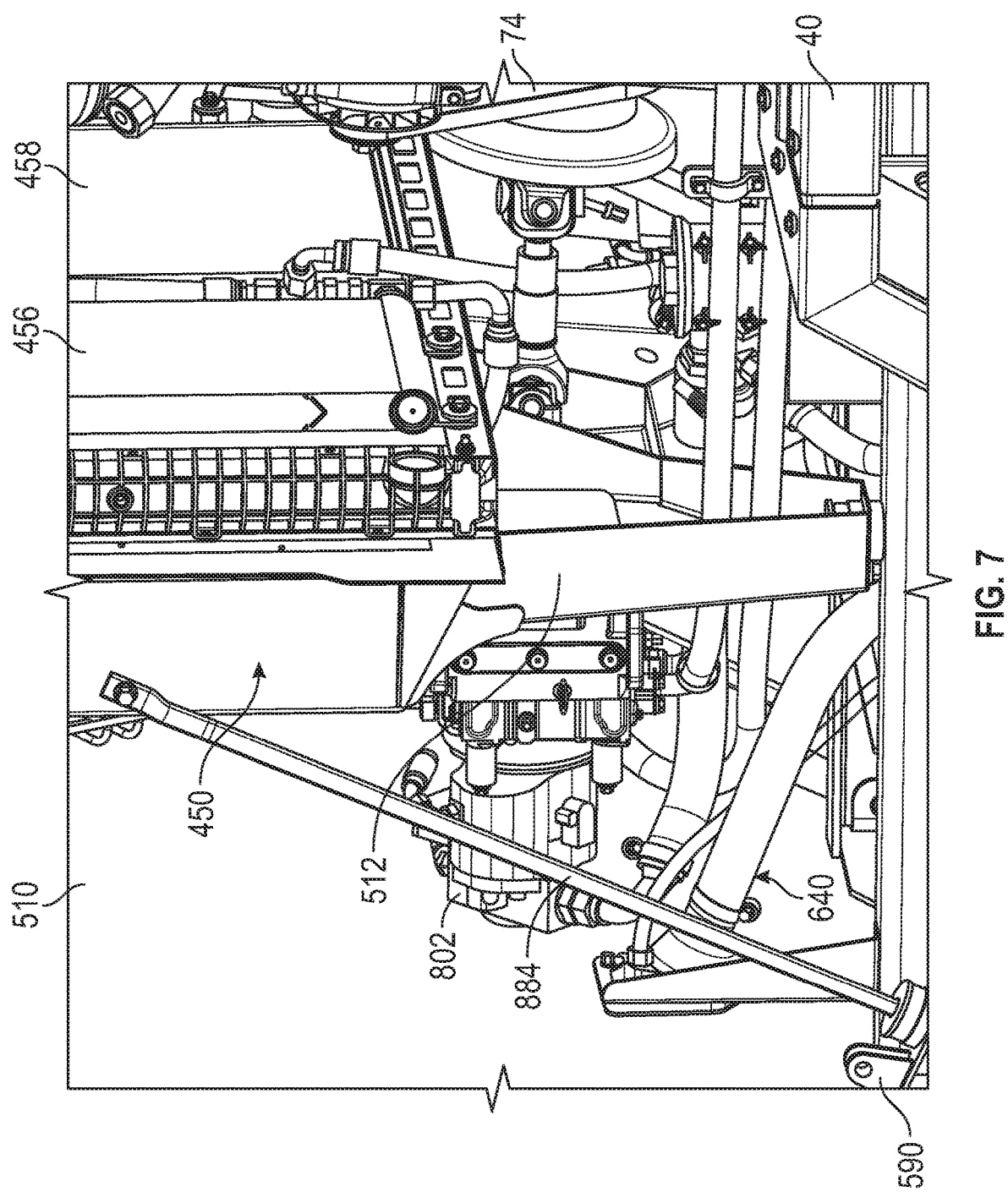
FIG. 7 is a side perspective view of the cooling system and drum pump of FIG. 4.

Referring to FIGS. 5-7, the rear end 24 of the concrete mixer truck 10 without a hood 486 is shown. The cooling frame 452 is coupled to the frame rails 40 and includes a first support pin 582 coupled to the cooling frame upper portion 510 and a pin support member 596 on the first lateral side 142 and a second support pin 584 coupled to the cooling frame upper portion 510 and a pin support member 596 on the second lateral side 144. The pin support member 596 may include one or more bushings to dampen vibration and minimize wear along the components. The first support pin 582 and the second support pin 584 are configured to provide longitudinal support to the cooling frame 452 without taking up too much space or impeding in the operation of the components within the hood 486. In some embodiments, a battery module 804 and a fluid reservoir 590 are disposed between the frame rails 40 (e.g., between the first lateral side 142 and second lateral side 144). The battery module 804 may be operably connected to the pump 802 to provide power to drive the pump 802. In other embodiments, the pump 802 is driven by a motor 574 disposed between the pump 802 and the cooling frame lower portion 512. The fluid reservoir 590 may be fluidly coupled to the pump 802 to provide fluid to various components along the concrete mixer truck 10 pumped by the pump 802.

The pump 802 is coupled to a cooling frame lower portion 512 positioned below the fan assembly 450 and fan 416 and is coupled to the cooling frame upper portion 514. According to an exemplary embodiment, the drum drive motor 130 is a hydraulic motor, the fluid reservoir 590 is a hydraulic fluid reservoir, and the pump 802 is a hydraulic pump. The pump 802 may be configured to pump fluid (e.g., hydraulic fluid, etc.) stored within the fluid reservoir 124 to drive the drum drive motor 130 through one conduit in the plurality of conduits 640.

According to an exemplary embodiment, the pump 802 is a variable displacement hydraulic pump (e.g., an axial piston pump, etc.) and has a pump stroke that is variable. The pump 802 may be configured to provide hydraulic fluid at a flow rate that varies based on the pump stroke (e.g., the greater the pump stroke, the greater the flow rate provided to the drum drive motor 130, etc.). The pressure of the hydraulic fluid provided by the pump 802 may also increase in response to an increase in pump stroke (e.g., where pressure may be directly related to work load, higher flow may result in higher pressure, etc.). The pressure of the hydraulic fluid provided by the pump 802 may alternatively not increase in response to an increase in pump stroke (e.g., in instances where there is little or no work load, etc.). The pump 802 may include a throttling element (e.g., a swash plate, etc.). The pump stroke of the pump 802 may vary based on the orientation of the throttling element. In one embodiment, the pump stroke of the pump 802 varies based on an angle of the throttling element (e.g., relative to an axis along which the pistons move within the axial piston pump, etc.). By way of example, the pump stroke may be zero where the angle of the throttling element is equal to zero. The pump stroke may increase as the angle of the throttling element increases. According to an exemplary embodiment, the variable pump stroke of the pump 802 provides a variable speed range of up to about 10:1. In other embodiments, the pump 802 is configured to provide a different speed range (e.g., greater than 10:1, less than 10:1, etc.).

In one embodiment, the throttling element of the pump 802 is movable between a stroked position (e.g., a maximum stroke position, a partially stroked position, etc.) and a destroked position (e.g., a minimum stroke position, a partially destroked position, etc.). According to an exemplary embodiment, an actuator is coupled to the throttling element of the pump 802. The actuator may be positioned to move the throttling element between the stroked position and the destroked position. In some embodiments, the pump 802 is configured to provide no flow, with the throttling element in a non-stroked position, in a default condition (e.g., in response to not receiving a stroke command, etc.). The throttling element may be biased into the non-stroked position. In some embodiments, the drum driver 114 is configured to provide a first command signal. In response to receiving the first command signal, the pump 802 (e.g., the throttling element by the actuator thereof, etc.) may be selectively reconfigured into a first stroke position (e.g., stroke in one direction, a destroked position, etc.). In some embodiments, the drum driver 114 is configured to additionally or alternatively provide a second command signal. In response to receiving the second command signal, the pump 802 (e.g., the throttling element by the actuator thereof, etc.) may be selectively reconfigured into a second stroke position (e.g., stroke in an opposing second direction, a stroked position, etc.). The pump stroke may be related to the position of the throttling element and/or the actuator.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the pump 802 may overcome the resilient member to actuate the throttling element into the stroked position (e.g., by actuating movable elements of the valve into positions where a hydraulic circuit actuates the throttling element into the stroked position, etc.).

Multi-Function Pump with a Hydraulic Circuit and Pump Control Logic

Figure 10:
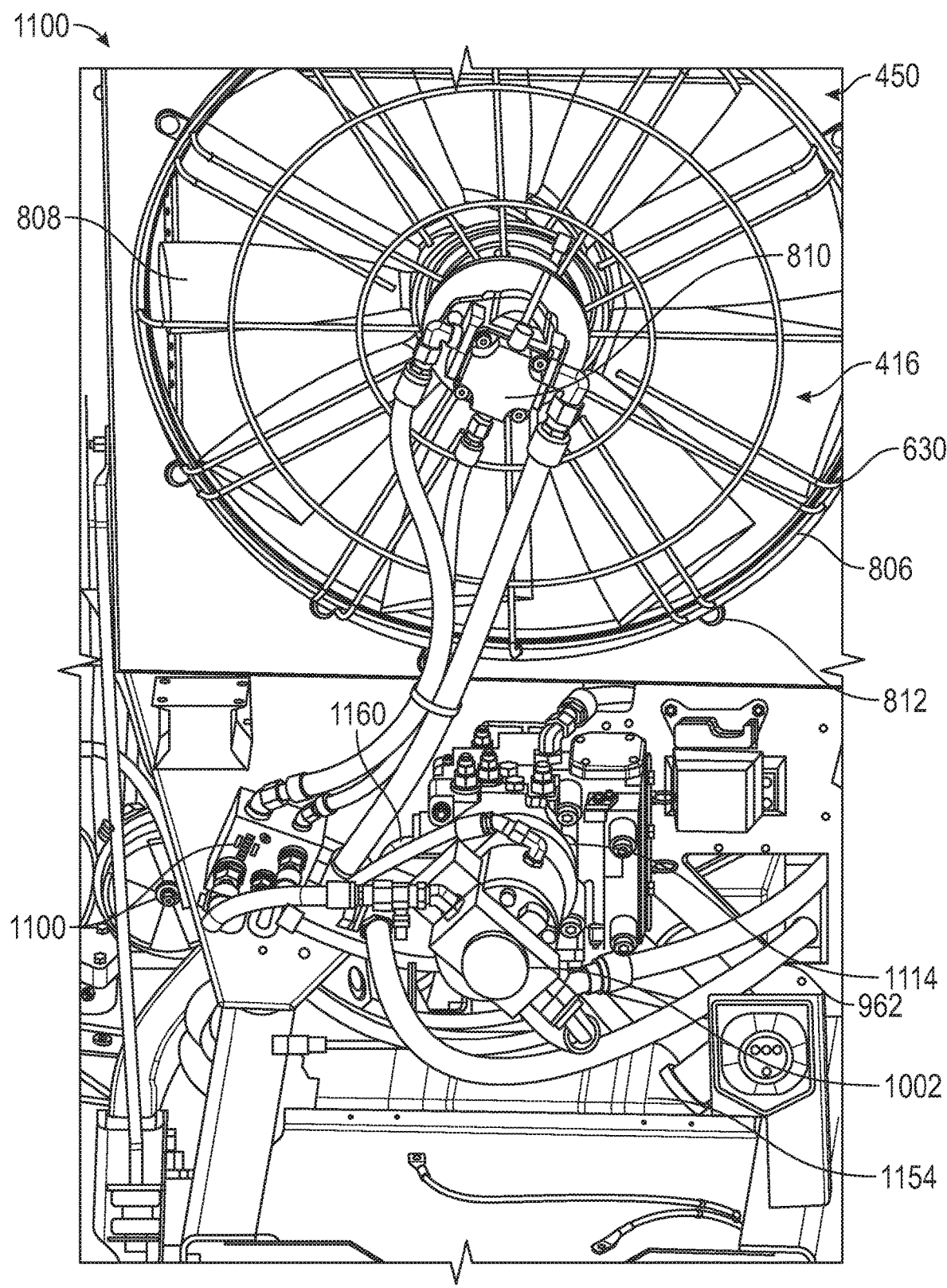
FIG. 10 is a rear perspective view of the multi-function pump

As shown in FIG. 10, the pump 802 of FIGS. 4-7 may be implemented with a hydraulic circuit and pump control logic 1100 to provide a single pump 1002 that provides power to multiple auxiliary functions of the concrete mixer truck 10 including any one of chute 46 movement (e.g., rotation, raise/lower, etc.), chute 46 folding and unfolding, providing water to the drum assembly 6 or other components, driving a fan assembly 450, and controlling an axle assembly of the drive system 20. As shown in FIG. 10, the pump 1002 is coupled to the cooling frame lower portion 512. In some embodiments, the pump 1002 is coupled to another portion of the cooling frame 452 or is disposed along a different portion of the concrete mixer truck 10 or proximally located. The pump 1002 is configured to reduce hydraulic complexity along the concrete mixer truck 10, improve hydraulic efficiency, and allows ease of installation of additional hydraulic components.

As shown in FIG. 8, a hydraulic circuit and pump control logic 850 extends from the front end 22 to the rear end 24 of the concrete mixer truck 10 is shown. The hydraulic circuit and pump control logic includes a chute pump 882 with three different pumps that is operably connected to a hydrostat device 860. The hydrostat device 860 is configured to detect the presence of water as a prevention against drying out, overflow, etc. The chute pump 882 is configured to control movement of the main chute 46 by providing pressurized hydraulic oil from the fluid tank 854 to power the chute manifold 880. The three pumps of the chute pump 882 each provide pressurized hydraulic oil to power the chute actuator 122, chute folding actuator 78, and chute rotation actuator 94, respectively. The three pumps of the chute pump 882 may be a 1.02 CIPR (16.7 cc), 1.16 CIPR (19 cc), and a 1.87 CIPR (30.6 cc). In some embodiments, a load span tag axle (LSTA) 862 is powered by one of the chute pumps 882. A steering pump 870 is coupled to a steering gear 874 and is configured to provide feel (e.g., feedback) and wheel speed to a steering wheel in the cab 18 and physically operated by the operator. In some embodiments, the steering pump 870 includes four pumps configured to pressurized hydraulic oil from the fluid tank 854 to a steering assembly and steering gear 874. A flow divider 872 is configured to provide control flow to the steering gear 874 and return excess or unnecessary pressurized hydraulic oil back to the fluid tank 854.

Figure 9:
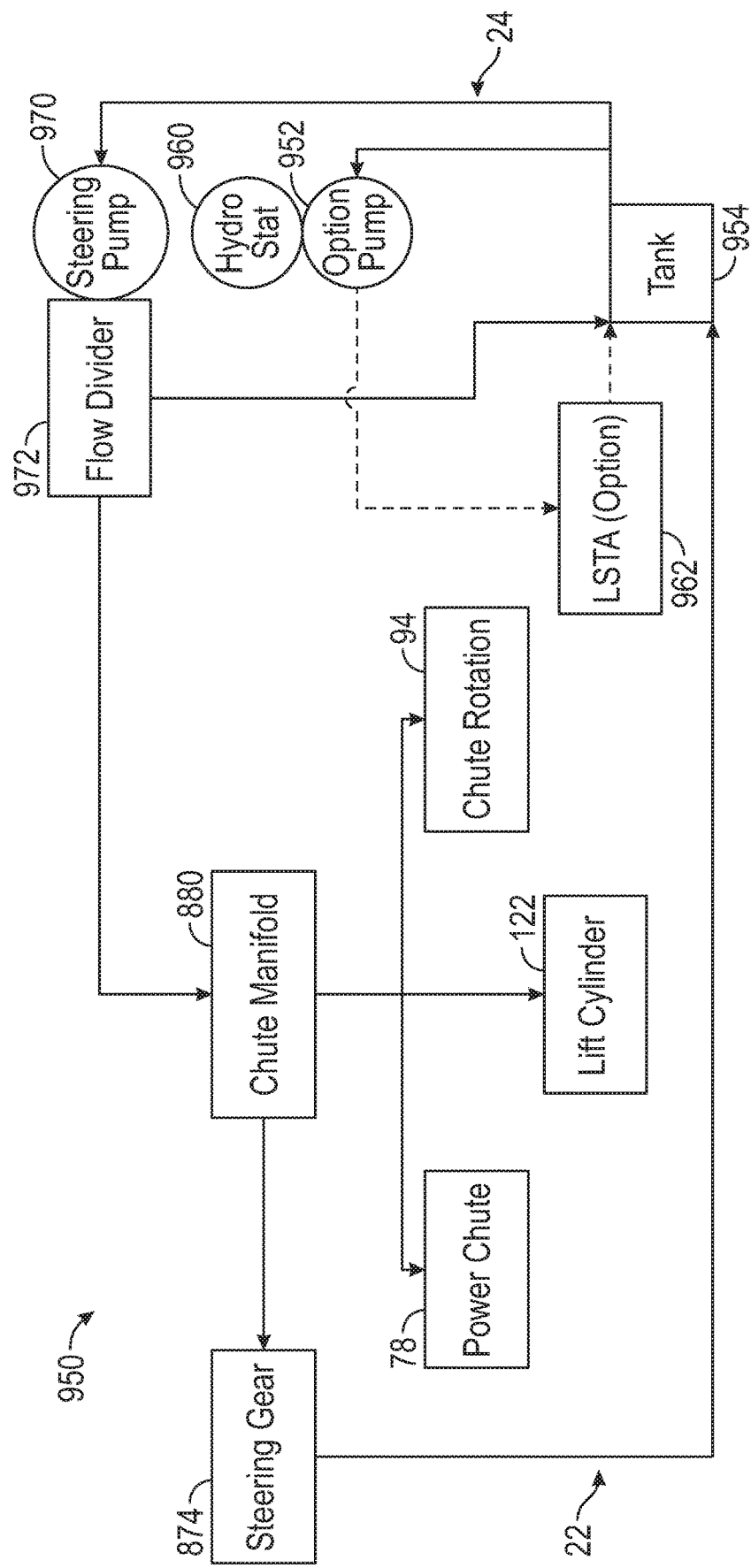
FIG. 9 is a system flow diagram of another conventional hydraulic circuit design and control logic, according to another example embodiment.

As shown in FIG. 9, a hydraulic circuit and pump control logic 950 that extends from the front end 22 to the rear end 24 of the concrete mixer truck 10 is shown. The hydraulic circuit and pump control logic 950 of FIG. 9 is similar to the hydraulic circuit and pump control logic 850 of FIG. 8. A difference between the hydraulic circuit and pump control logic 950 and the hydraulic circuit and pump control logic 850 is the steering pump 970 of the hydraulic circuit and pump control logic 950 powers a majority of the components. Accordingly, like numbering is used to identify like components of the hydraulic circuit and pump control logic 850 and the hydraulic circuit and pump control logic 950. The hydraulic circuit and pump control logic includes an optional pump 952 that is operably connected to a hydrostat device 960. The hydrostat device 960 is configured to detect the presence of water as a prevention against drying out, overflow, etc. In some embodiments, a load span tag axle (LSTA) 962 is powered by the optional pump 952. A steering pump 970 is configured to provide pressurized hydraulic oil from the fluid tank 954 to power the steering gear 874 and the chute manifold 880. The steering pump 970 is configured to control movement of the main chute 46 by providing pressurized hydraulic oil from the fluid tank 954 to power the chute manifold 980. The steering pump 970 provides pressurized hydraulic oil to power the chute actuator 122, chute folding actuator 79, and chute rotation actuator 94. The steering pump 970 is further configured to provide pressurized hydraulic oil to power a steering gear 974 downstream of the chute manifold 880. The steering gear 874 is configured to provide feel (e.g., feedback) and wheel speed to a steering wheel in the cab 19 and physically operated by the operator. A flow divider 972 is configured to provide control flow to the steering gear 974 and return excess or unnecessary pressurized hydraulic oil back to the fluid tank 954. A drawback of the steering pump 970 solely providing pressurized hydraulic oil from the fluid tank 954 to power the chute manifold 880 and the steering gear 874 is that the steering feel and speed of the concrete mixer truck and/or the chute manifold 880 may be impeded when the multi-function pump is powering one or more of the multiple auxiliary functions.

Figure 11:
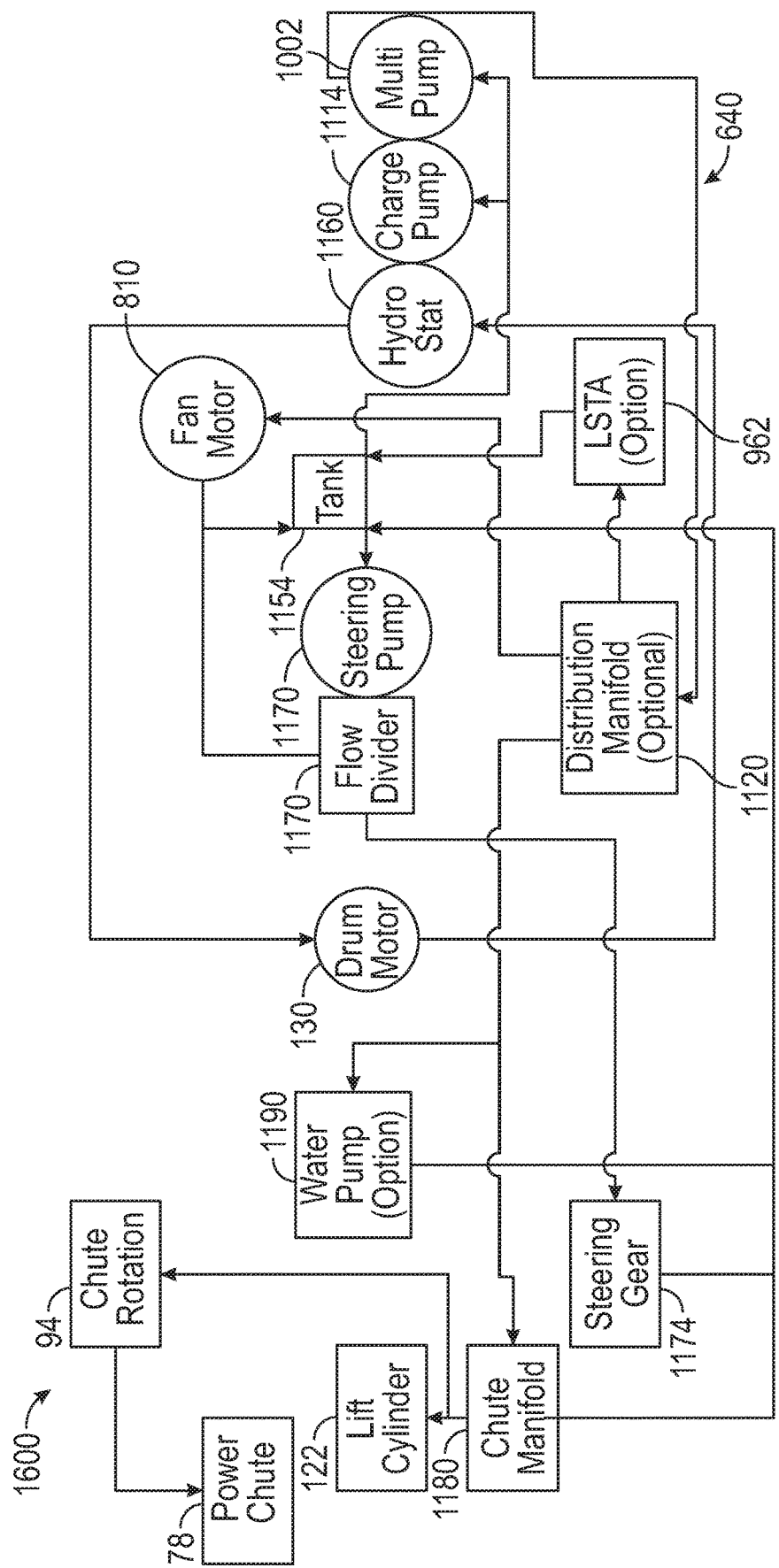
FIG. 11 is a system flow diagram of a hydraulic circuit design and control logic implemented with the multi-function pump of FIG. 10.

Turning to FIGS. 10 & 11, a hydraulic circuit and pump control logic 1100 and multi-function pump 1002 are shown. The multi-function pump 1002 is operably connected to a hydrostat device 1160 that is configured to detect the presence of water as a prevention against drying out, overflow, or other undesirable water conditions. In some embodiments, a charge pump 1114 is operably connected to the multi-pump 1002 to provide additional pump power to the multi-function pump 1002. The multi-function pump 1002 is configured to provide pressurized hydraulic oil from the fluid tank 1154 to power the chute manifold 1180, drum motor 130, and the fan motor 810. The multi-pump 1002 provides pressurized hydraulic oil to power the chute actuator 122, chute folding actuator 79, and chute rotation actuator 94 by way of the chute manifold 1180. In some embodiments, a distribution manifold 1120 (e.g., actuator) is implemented to control the flow of pressurized hydraulic oil from the multi-pump 1002 to the chute manifold 1180. In some embodiments, a load span tag axle (LSTA) 1162 is powered by the multi-function pump 1002. A separate steering pump 1170 is implemented within the hydraulic circuit and pump control logic 1100 and is coupled to a steering gear 1174 and is configured to provide feel (e.g., feedback) and wheel speed to a steering wheel in the cab 18 and physically operated by the operator. A flow divider 1172 is configured to provide control flow to the steering gear 1174 and return excess or unnecessary pressurized hydraulic oil back to the fluid tank 1154. The dedicated steering pump 1170 and/or steering circuit prevents the steering feel and speed of the concrete mixer truck 10 to be impeded when the multi-function pump 1002 is powering one or more of the multiple auxiliary functions.

Expanding upon the multi-function pump 1002, the multi-function pump 1002 may be an electronically controlled variable displacement piston pump. A controller may be configured to determine a status of a component (e.g., fan assembly 450, a drum assembly 6, a hopper assembly 8) and use the status of the component to determine the displacement of the multi-function pump 1002 and which conduit in the plurality of conduits 640 is needed to provide the hydraulic fluid to the component. In some embodiments, the controller is an actuator that is electrically controlled (e.g., by applying a voltage to the actuator), pneumatically controlled (e.g., by applying pressurized air to the actuator), or hydraulically controlled (e.g., by applying a hydraulic pressure to the actuator). In some embodiments, one or more control valves are fluidly coupled between the multi-function pump 1002 and the various components. The control valves are configured to regulate and/or control the flow of pressurized hydraulic fluid within component or assembly. The control valves may include check valves, relief valves, flow control valves, directional control valves, or other types of valves. The control valves may be passively controlled (e.g., activated when a pressure overcomes a spring within the valve, etc.) or actively controlled (e.g., by an operator through a lever, switch, or dial, electronically by the controller, by a pneumatic or hydraulic pilot pressure controlled by the controller). In some embodiments, the multi-function pump 1002 is configured to receive hydraulic fluid at a relatively low pressure (e.g., atmospheric pressure, etc.) from a fluid tank 1154 (e.g., reservoir). Because the multi-function pump 1002 has a variable displacement, the flow rate of hydraulic fluid leaving the multi-function pump 1002, and accordingly the speeds of the various components powered by the multi-function pump 1002, can be controlled using the distribution manifold 1120, actuator, or similar controller. Beneficially, the variable displacement of the multi-function pump 1002 experiences only minimal energy losses (e.g., due to the flowing of hydraulic fluid), and experiences no significant decrease in efficiency when operating the various components at less than the maximum speed.

With respect to the drum drive motor 130, the multi-function pump 1002 may be configured to pump fluid (e.g., hydraulic fluid, etc.) stored within the fluid tank 1154 to drive the drum driver 114. According to an exemplary embodiment, the multi-function pump 1002 is configured to facilitate selectively and/or adaptively controlling the output of the drum driver 114. In one embodiment, the multi-function pump 1002 includes a variable displacement hydraulic pump (e.g., an axial piston pump, etc.) and has a pump stroke that is variable. The multi-function pump 1002 may be configured to pressurize hydraulic fluid based on the pump stroke (e.g., the greater the pump stroke, the higher the pressure, and the faster the drum driver 114 rotates the mixing drum 14, etc.). The multi-function pump 1002 may include a throttling element (e.g., a swash plate, etc.). In some embodiments, the multi-function pump 1002 may function as a water pump to provide a flow of fluid (e.g., water) through a nozzle (e.g., for fire suppressant applications, for irrigation applications, for pressure washing applications, for concrete mixing applications, etc.).

The multi-function pump 1002 can control the fan motor 810 and facilitates the fan 416 operating at any speed within a range (e.g., a range from 0 rpm to 2000 rpm) as desired. The maximum speed of this range is determined by the speed of the engine 74 and the displacements of the multi-function pump 1002 and fan motor 810. Accordingly, a controller on the fan assembly 450 or on the multi-function pump 1002 may control the speed of the fan 416 such that the fan 416 operates for long periods of time at a relatively low speed. The multi-function pump 1002 can also be controlled to provide pressurized hydraulic oil to power one or more hydraulic actuators (e.g., chute actuator 122, chute folding actuator 79, and chute rotation actuator 94, etc.).

Cooling System Access

Turning to FIG. 12-18, a concrete mixer truck 1200 with a cooling system 1280 downstream of an engine 474 is described, according to an exemplary embodiment. The concrete mixer truck 1200 of FIGS. 12-18 is similar to the concrete mixer truck 10 of FIGS. 1-7. A difference between the concrete mixer truck 1200 and the concrete mixer truck 10 is the concrete mixer truck 1200 includes a cooling core 1202 adjacent the fan assembly 450 downstream of the engine 474. Accordingly, like numbering is used to identify like components of the concrete mixer truck 10 and the concrete mixer truck 1200. Conventional cooling systems typically mount the fan assembly to the engine with the pusher fan of the fan assembly upstream of the engine. Conversely, the cooling system 1280 of FIGS. 12-18 positions the cooling system 1280, and therefore the fan assembly 450, downstream of the engine 474 with the fan 416 on a rear side 1206 of a cooling core 1202. Positioning the fan assembly 450 on the rear side 1206 of the cooling package improves accessibility to the front side 1204 of the cooling cores, provides greater access to the rear side 1206 of the cooling cores, and increases serviceability of the cooling system 1280. Further, the front side 1204 is visible for inspection when an operator is in a standing position next to the concrete mixer truck 1200, thereby improving regular core inspection accuracy, convenience, and efficiency. Beneficially, the engine 474 has minimal connection to the cooling core 1202, which reduces the time needed to replace the engine in the concrete mixer truck 1200.

Figure 12:
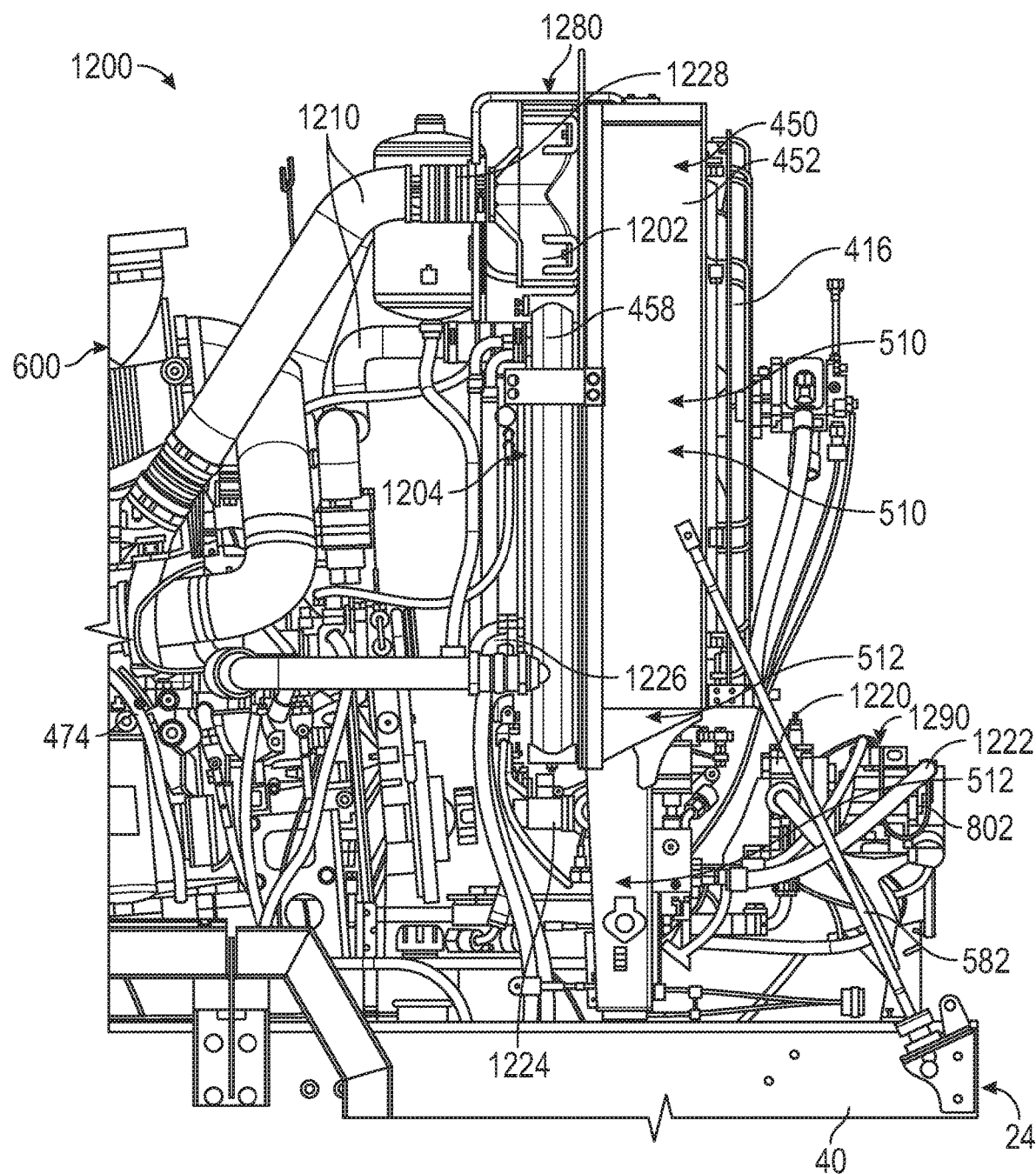
FIG. 12 is a side view of a cooling system with a fan assembly rear of a cooling package core, according to another example embodiment.
Figure 13:
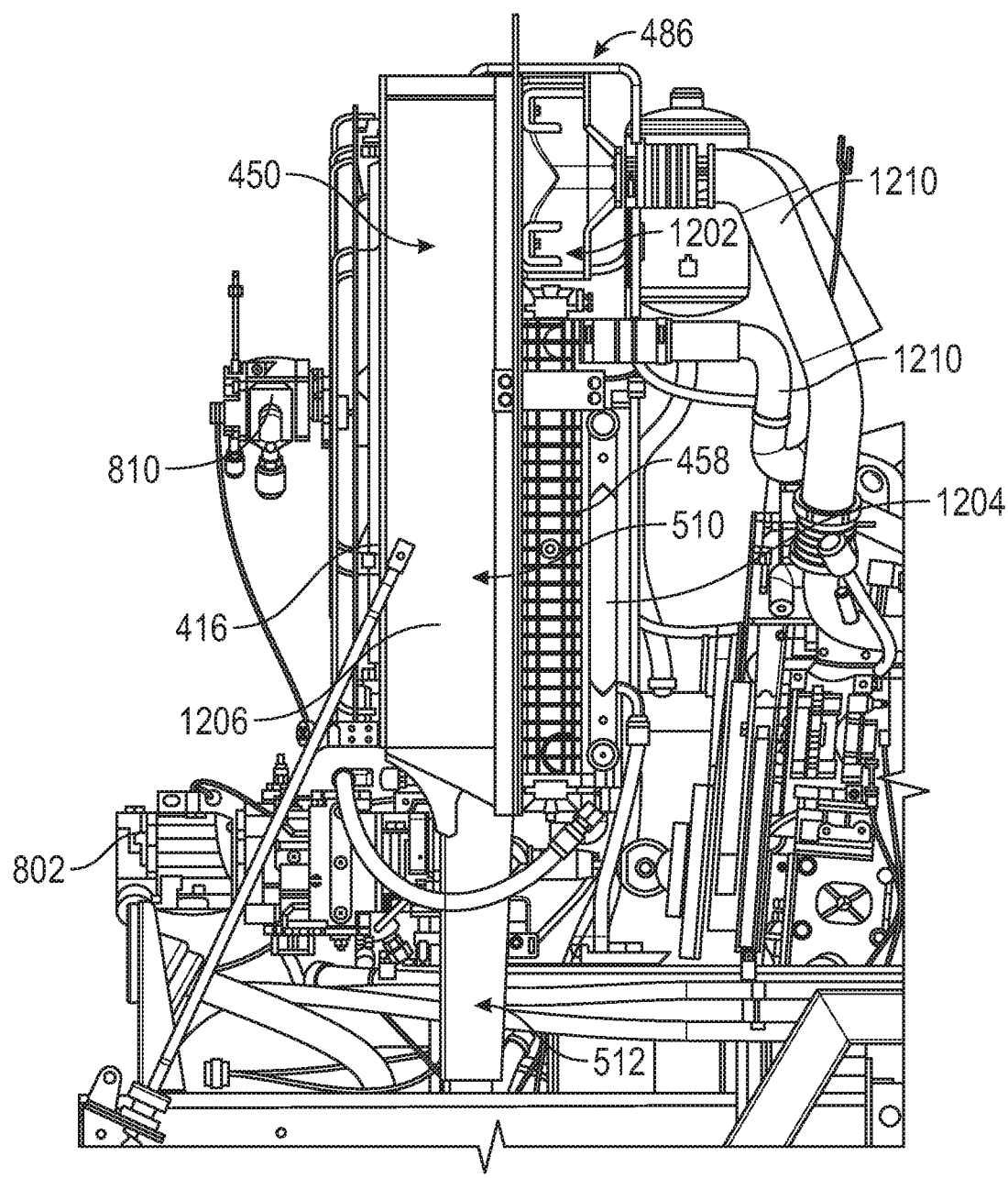
FIG. 13 is a side view of the cooling system with the fan assembly rear of the cooling package core of FIG. 12.
Figure 14:
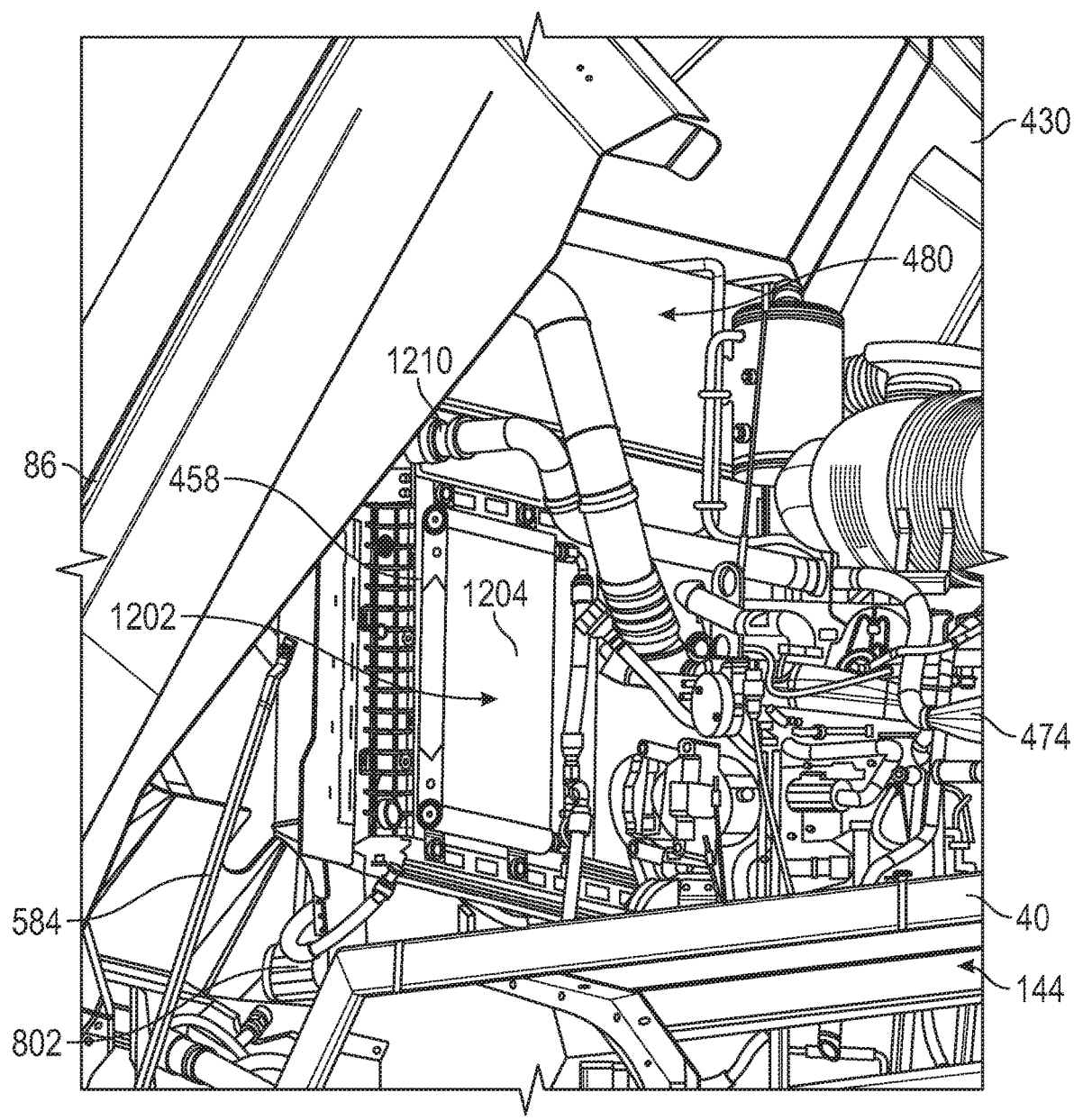
FIG. 14 is a left rear perspective view of the cooling system with the fan assembly rear of the cooling package core of FIG. 12.
Figure 15:
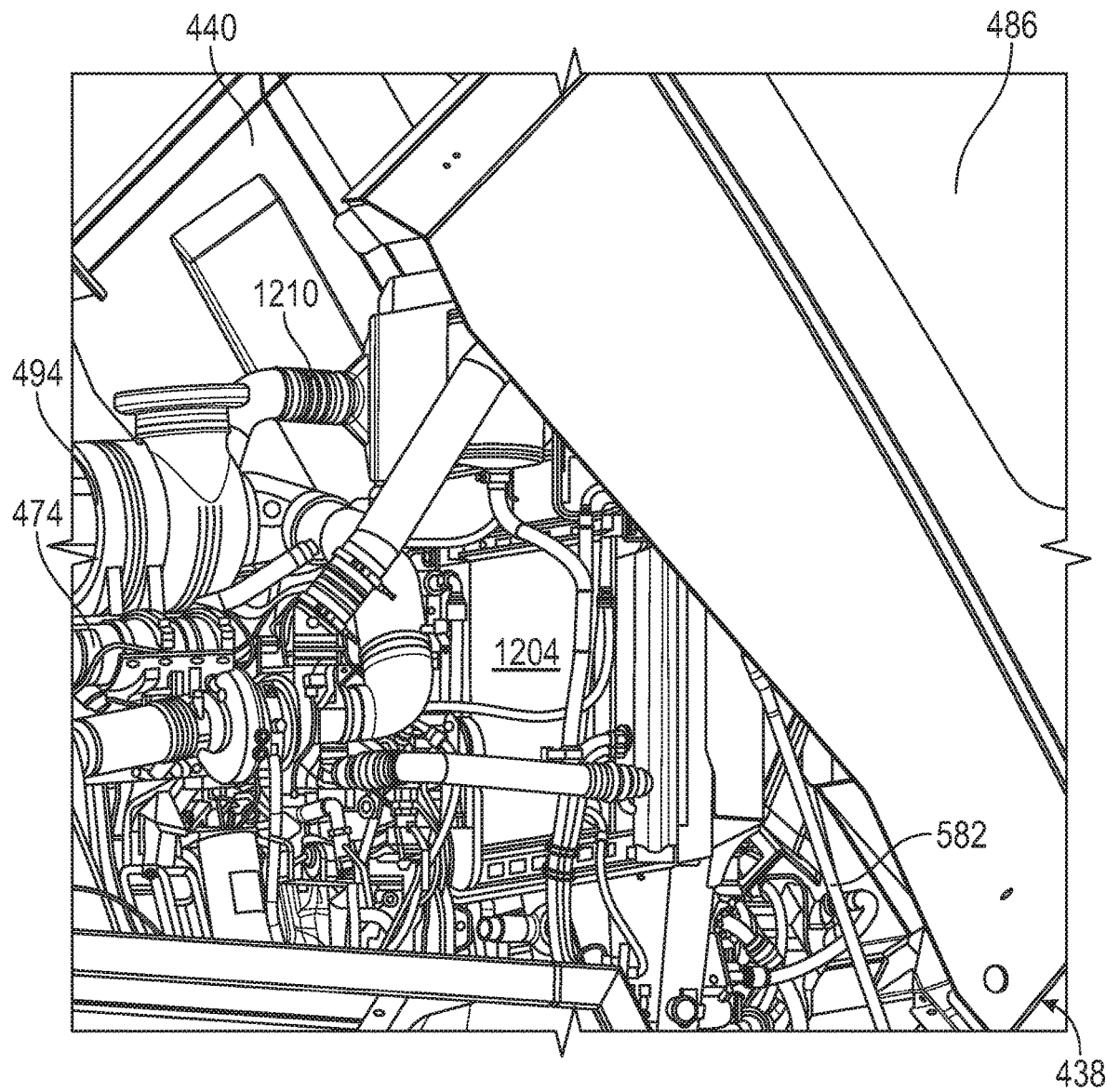
FIG. 15 is a right rear perspective view of the cooling system with the fan assembly rear of the cooling package core of FIG. 12.

Turning to FIG. 12, the engine 474 is coupled to the frame rails 40 upstream of the cooling system 1280. The cooling system 1280 includes the cooling frame 452 with a fan assembly 450 and cooling core 1202. The fan assembly 450 and cooling core 1202 are coupled to an upper portion 510 of the cooling frame 452. The lower portion 512 of the cooling frame 452 is coupled to the frame rails 40 and provides support, along with the first support pin 582 and second support pin 584, to the components coupled to the cooling frame 452. An accessory module 1290 is positioned downstream of the engine 474 and disposed below the cooling system 1280. The accessory module 1290 may be coupled to the engine 474 and/or the fan motor 416. In some embodiments, the accessory module 1290 may include a drive motor 1222 and transmission 1222 and/or accessory pump. In other embodiments, the accessory module 1290 may include a hydraulic drive pump 1220 and a hydraulic accessory pump 1222. One or both of the drive pump 1220 and the accessory pump 1222 may be fluidly coupled to the hydraulic fluid tank and configured to receive a working fluid, such as, e.g., hydraulic fluid, at a low pressure (e.g., atmospheric pressure) from the hydraulic fluid tank. The drive pump 1220 and the accessory pump 1222 may be configured to receive rotational mechanical energy and output a flow of pressurized hydraulic fluid to drive one or more components of the concrete mixer truck 10. The shaft 1224 may be coupled to the engine 1274 and accessory module 1290 and is configured to receive rotational mechanical energy from the transmission and transfer this energy to the various operably attached drive elements attached thereto.

Referring to FIGS. 12-15, the cooling core 1202 includes a front side 1204 and a rear side 1206 with a plurality of cooling cores disposed between the front side 1204 and the rear side 1206. The plurality of cooling cores may include one or more radiators 458. Cooling conduits 1210 are fluidly connected to the cooling core 1202 an include a conduit inlet 1228 on a top end of the cooling core 102 configured to receive a fluid and an conduit outlet 1226 on a bottom end of the cooling core 102 configured to expel the fluid. The rear side 1206 is adjacent to the fan assembly 450 such that air flowing through the cooling core 1202 exits into the fan assembly 450. An operator can more readily access the cooling core 1202 due to the positioning away from, and separate from, the engine.

Figure 16:
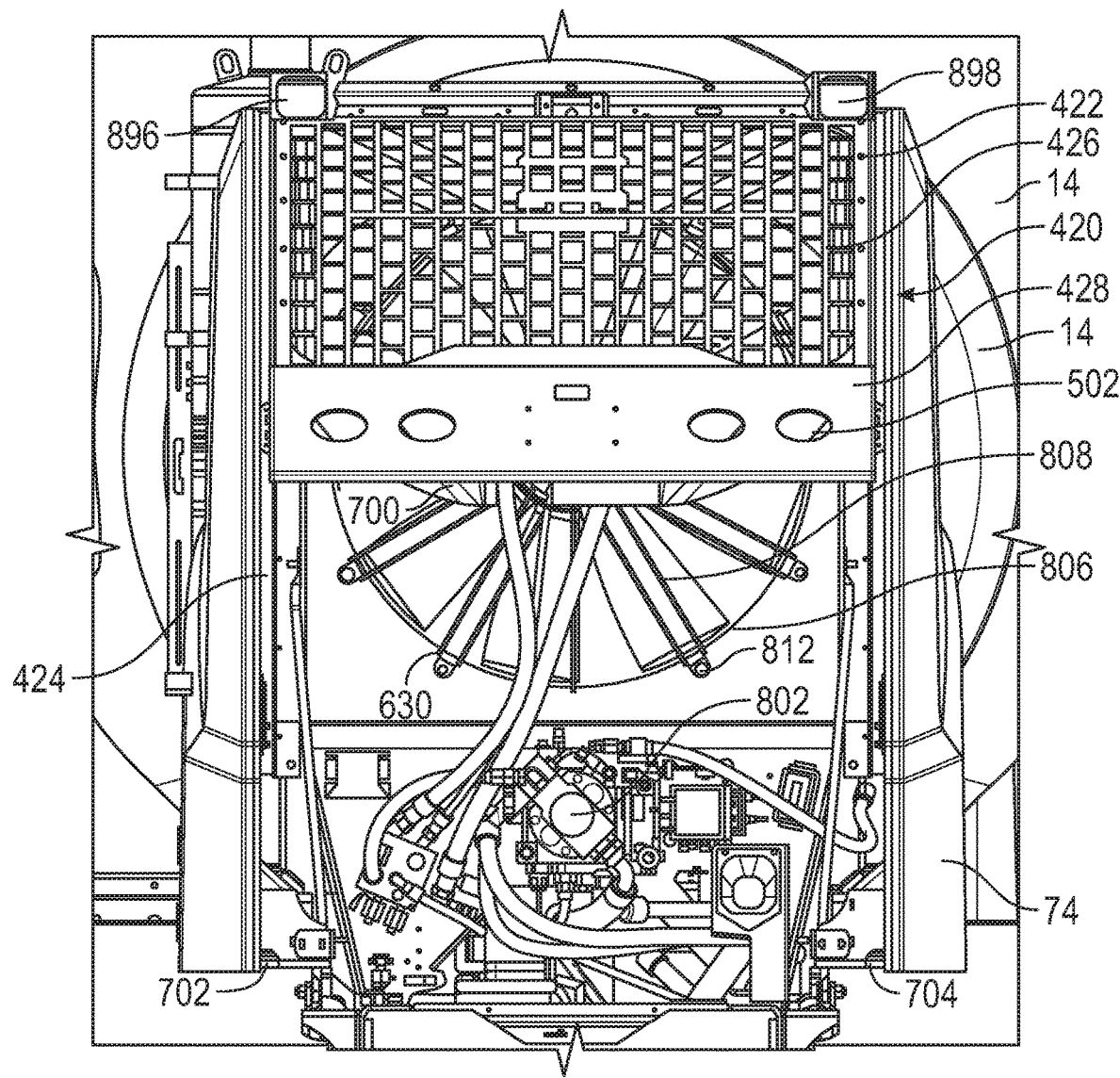
FIG. 16 is a rear view of the cooling system with the fan assembly rear of the cooling package core of FIG. 12.
Figure 17:
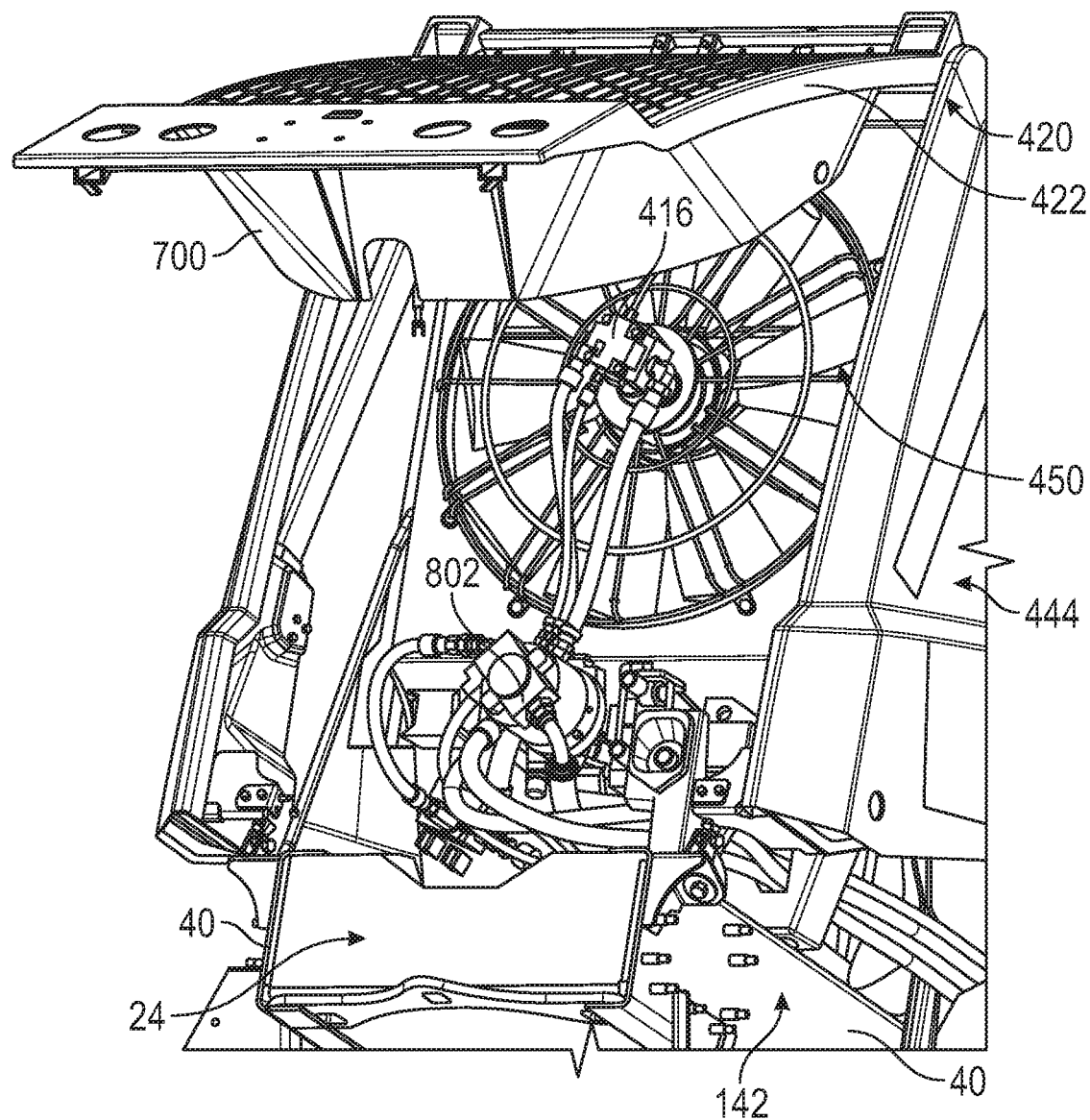
FIG. 17 is a right rear perspective view of the cooling system with the fan assembly rear of the cooling package core of FIG. 12.
Figure 18:
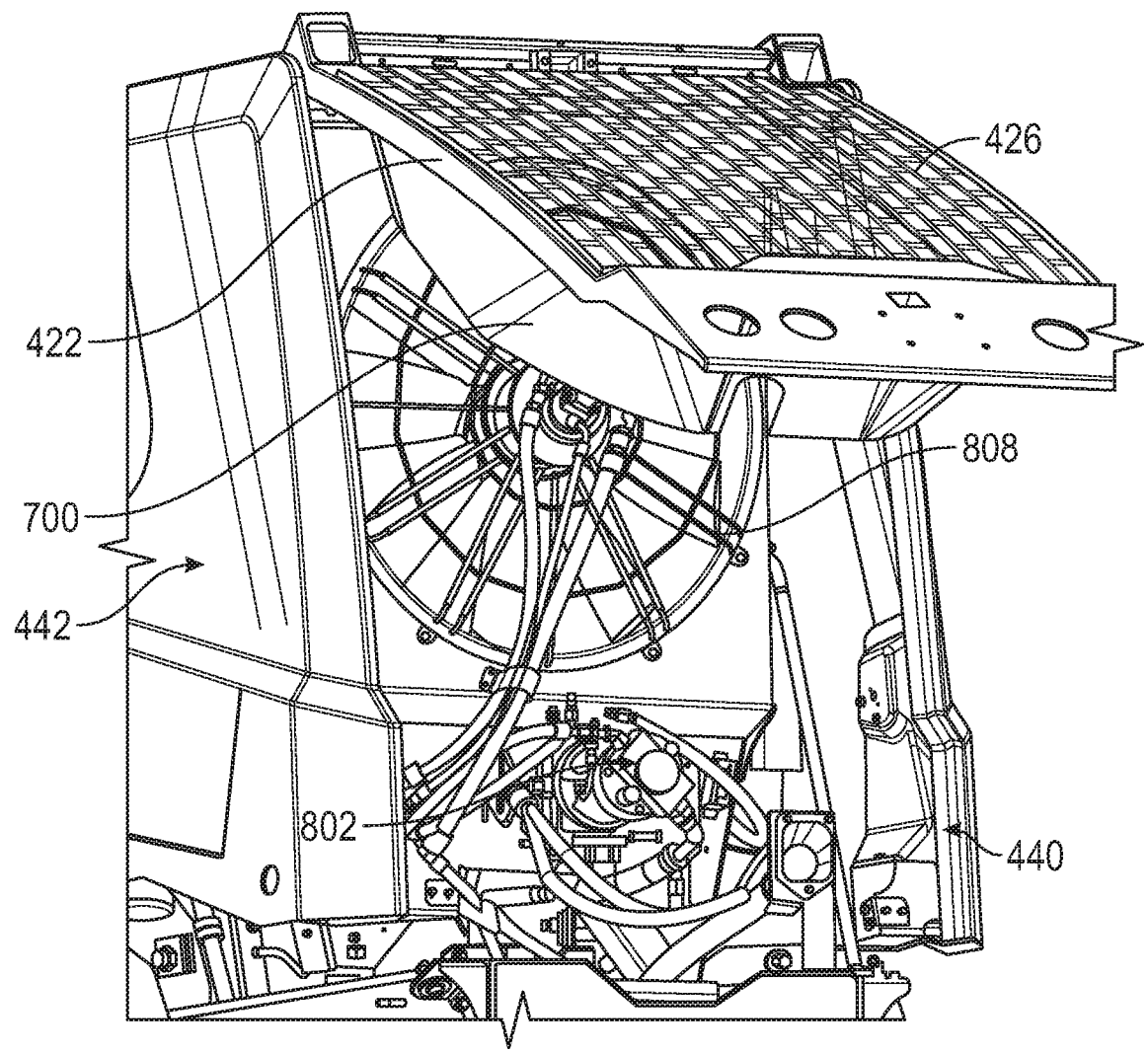
FIG. 18 is a left rear perspective view of the cooling system with the fan assembly rear of the cooling package core of FIG. 12.

Referring to FIGS. 16-18, the cooling system 1280 is shown installed within the hood 486 with the hatch 420 in an open position. The hatch 420 is disposed over a hatch opening 424 and is configured to provides access to the components cooling system 1280 on the downstream side (e.g., fan assembly 450) when the hatch 420 is in an open, as shown in FIGS. 16-18. The hatch 420 includes a first hatch coupling member 896 near the first lateral side 142, a second hatch coupling member 898 near the second lateral side 144, and a hatch door 422. The first hatch coupling member 896 and the second hatch coupling member 898 are configured to move the hatch door 422 from the closed, first position to the open, second position. The hatch door 422 includes a grill 426 and a bottom hatch portion 428. The bottom hatch portion 428 includes a plurality of light apertures 502 configured to receive a plurality of lights. The grill 426 extends from the bottom hatch portion 428 axially toward the top of the hatch 420. The grill 426 is configured to provide low restriction around the outer parts of the conical internal portion 700 as the conical internal portion 700 is where a majority of the airflow 600 from the fan 416 flows.

As shown in FIGS. 17 & 18, the hatch door 422 includes a conical internal portion 700 that protrudes from an internal surface of the hatch door 422 toward the front hood end 438. The conical internal portion 700 is configured to direct hot air 600 out of the hood 486 from the fan 416 rearward—or slightly upward toward the rear hood end 440 to not disturb dust on the ground outside of the concrete mixer truck 10—to reduce recirculation and improve efficiency of the airflow in the hood. The conical internal portion 700 includes a slot 710 to accommodate one or more components and conduits that are configured to engage the fan motor 810. The conical internal portion 700 is configured to fit around the fan ring 806. The hood 486 may be coupled to the frame rails 40 by a first coupling member 702 along the bottom of the first hood side 442 and a second coupling member 704 along the bottom of the second hood side 444.

In operation, air 600 flows into the hood 486 through one or more openings and past the engine 474. The air 600 may be drawn (e.g., pulled) by the rotation of the fan blades 808 of the fan 416 downstream of the engine 474. The air 600 flows through the front side 1204 of the cooling core 1202 and passes through one or more cooling cores, including a radiator 458, and out of the rear side 1206 of the cooling core. The air 600 entering the front side 1204 will be at a higher temperature than the air 600 exiting the rear side 1206. The air 600 passes through the fan 416 and is pushed out of the hatch door 422 and grill 426 in the rear hood end 440. In some embodiments, the cooling conduits 1210 provide a fluid through the cooling cores to further dissipate heat and assist with cooling. In some embodiments, the accessory module 1290 may be configured to control the fan motor 810 and facilitates the fan 416 operating at any speed within a range (e.g., a range from 0 rpm to 2000 rpm) as desired. Accordingly, a controller on the fan assembly 450 or on the accessory module 1290 may control the speed of the fan 416 such that the fan 416 operates for long periods of time at a relatively low speed or higher speeds to achieve a certain level of cooling in the system.

Referring to FIGS. 19-22, a cooling system 1902 with a cooling core 1904 and a fan assembly 450 with a fan 1906 is shown in various installation orientation with respect to the engine 1974 and an accessory module 1990. In some embodiments, the accessory module 1990 may include a drive motor 1922 and transmission 1922 and/or accessory pump. In other embodiments, the accessory module 1990 may include a hydraulic drive pump 1920 and a hydraulic accessory pump 1922. One or both of the drive pump 1920 and the accessory pump 1922 may be fluidly coupled to the hydraulic fluid tank and configured to receive a working fluid, such as, e.g., hydraulic fluid, at a low pressure (e.g., atmospheric pressure) from the hydraulic fluid tank. The drive pump 1920 and the accessory pump 1922 may be configured to receive rotational mechanical energy and output a flow of pressurized hydraulic fluid to drive one or more components of the concrete mixer truck 10. The shaft 1924 may be coupled to the engine 1974 and accessory module 1990 and is configured to receive rotational mechanical energy from the transmission and transfer this energy to the various operably attached drive elements attached thereto.

Figure 19:
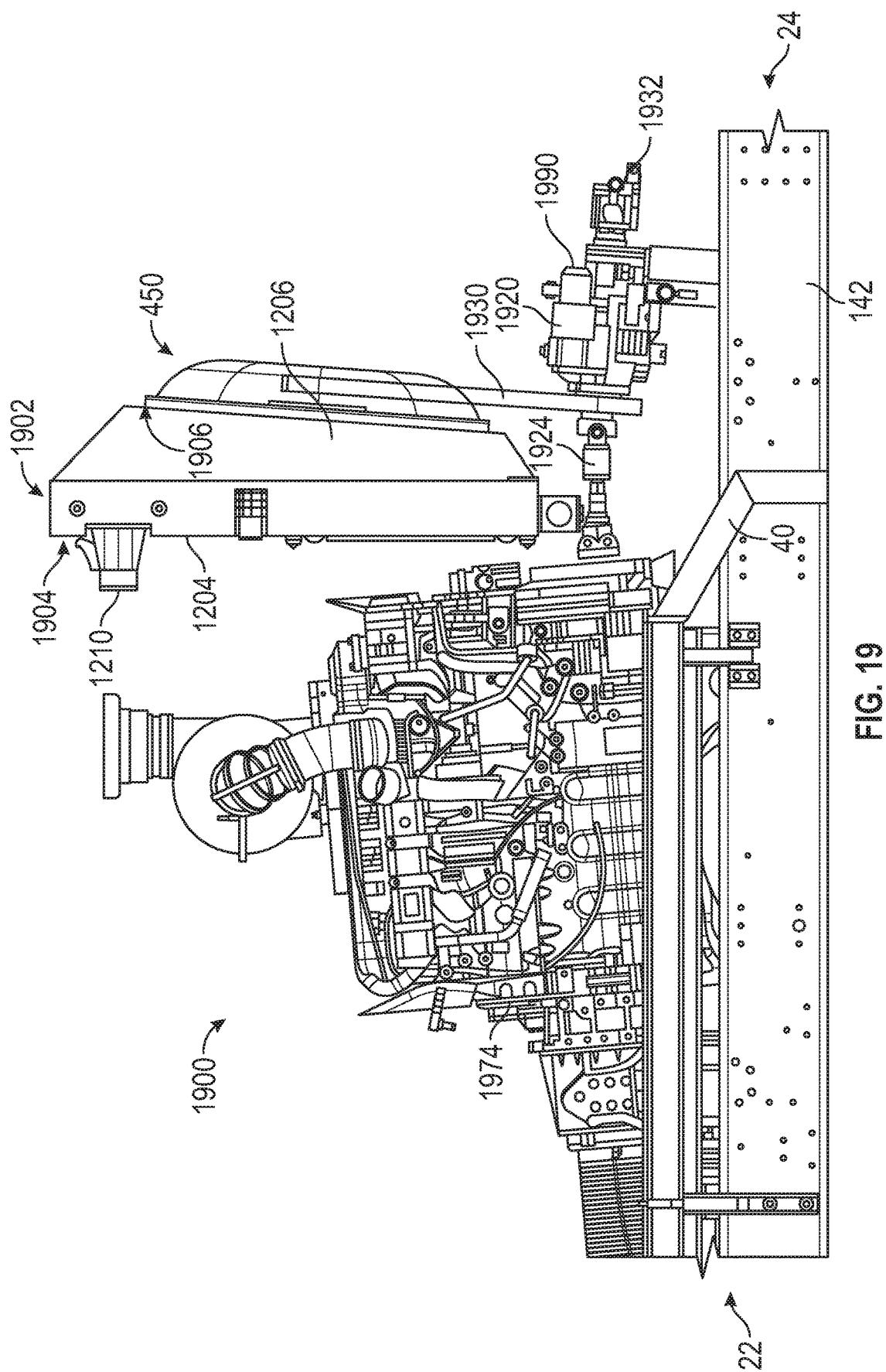
FIG. 19 is a side view of a cooling system with a fan assembly rear of a cooling package core in a first orientation, according to another example embodiment.

FIG. 19 shows a first orientation 1900 of the cooling system 1902 with a cooling core 1904 and a fan assembly 450. In the first orientation 1900, air flows past the engine 1974 drawn by the fan 1906 and passes through the front face 1204 of the cooling core 1904, out of the rear face 1206 of the cooling core and into the fan assembly 450. The front face 1204 of the cooling core 1904 is positioned downstream (e.g., toward the rear end 24) of the engine 1974. The rear face 1206 of the cooling core 1904 is positioned adjacent the fan 1906. In some embodiments, the fan 1906 has a size of 38" to increase flow capacity. The accessory module 1990 is downstream of the fan assembly 450 and includes drive member 1930 configured to drive the fan motor 416. As shown in FIG. 19, the drive member 1930 is a fan belt. In the first orientation 1900, the fan 1906 is on the rear face 1206 of the cooling package 1904 and improves accessibility to the front face 1204 of the cooling cores of the cooling package 1904. Further, the rear face 1206 of the cooling cores of the cooling package 1904 are more accessible than conventional cooling system orientations.

Figure 20:
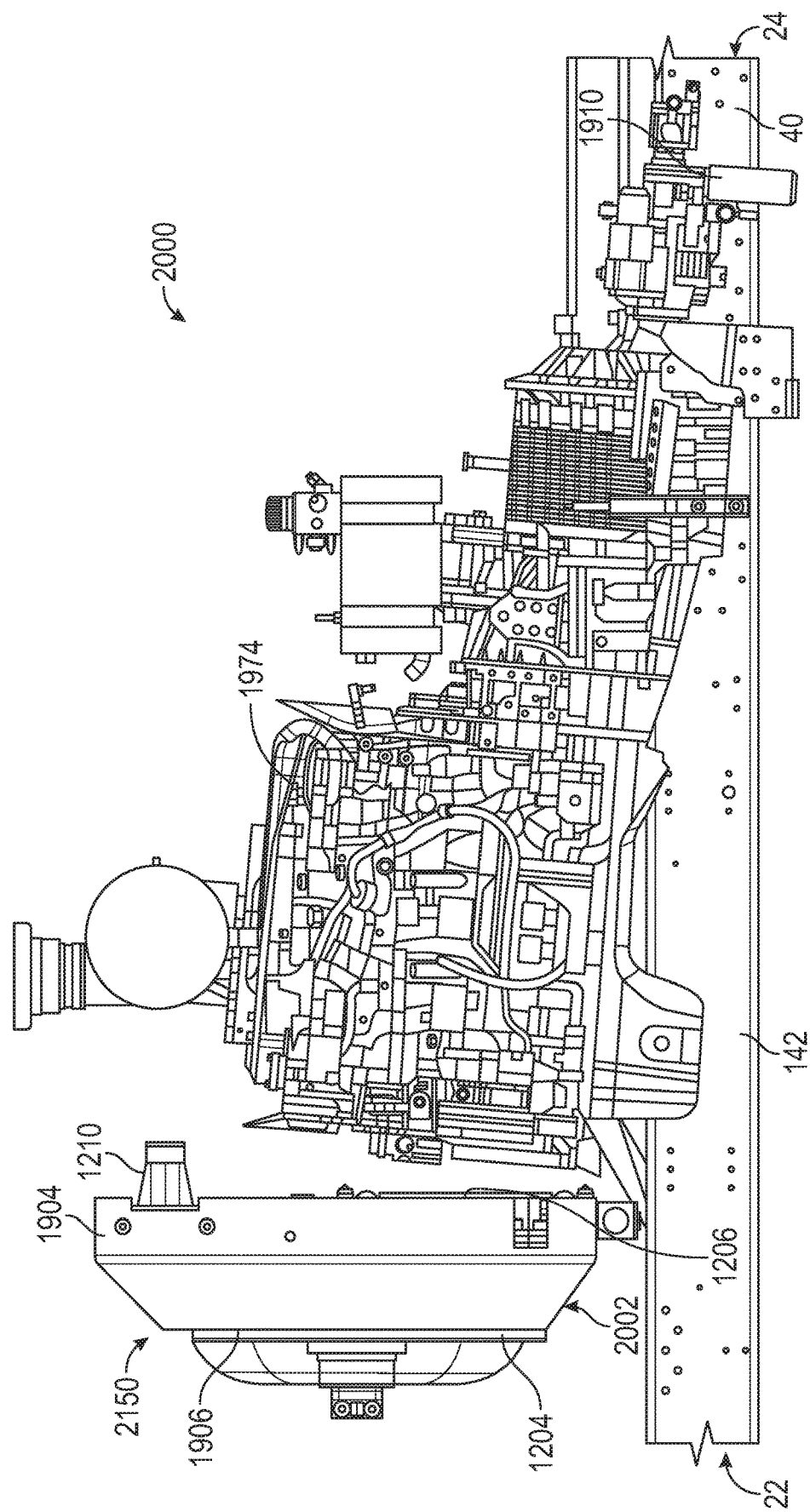
FIG. 20 is a side view of a cooling system with a fan assembly rear of a cooling package core in a second orientation, according to another example embodiment.

FIG. 20 shows a second orientation 2000 of the cooling system 2002 with a cooling core 1904 and a fan assembly 450. In the second orientation 2000, the cooling system 2002 is positioned upstream (e.g., toward the front end 22) of the engine 1974 and flipped about the central axis. In the second orientation 2000, air flows through the fan 1906 of the fan assembly 450 and is pushed through the rear face 1206 of the cooling core 1904 and out of the front face 1204 of the cooling core 1904 toward the engine 1974. The front face 1204 of the cooling core 1904 is positioned upstream (e.g., toward the rear end 24) of the engine 1974. The rear face 1206 of the cooling core 1904 is orientated upstream of the front face 1204 and is positioned adjacent the fan 1906. In some embodiments, the fan 1906 has a size of 38" to increase flow capacity. The accessory module 1990 is downstream of the engine 1974.

Figure 21:
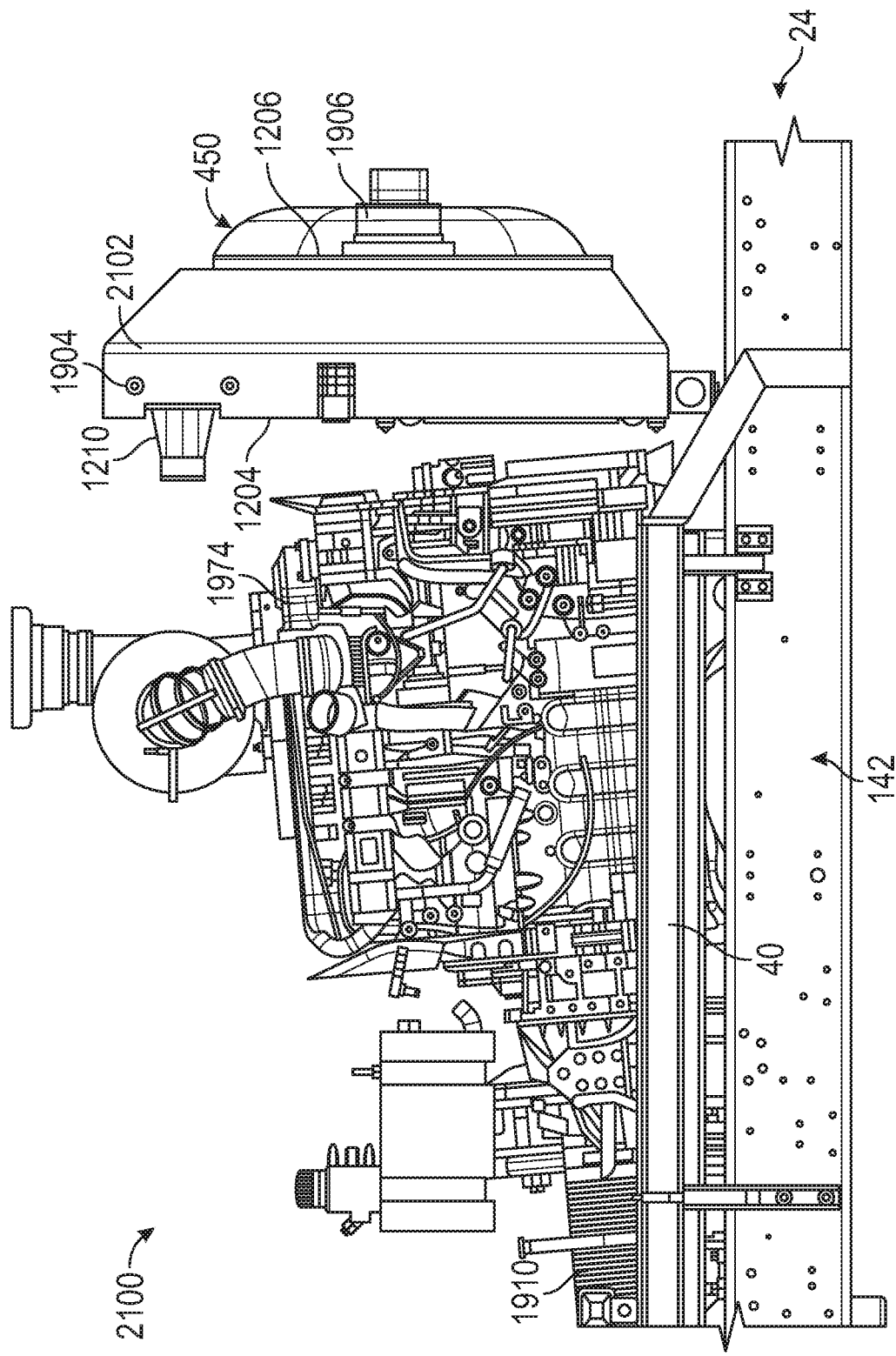
FIG. 21 is a side view of a cooling system with a fan assembly rear of a cooling package core in a third orientation, according to another example embodiment.

FIG. 21 shows a third orientation 2100 of the cooling system 2102 with a cooling core 1904 and a fan assembly 450. In the third orientation 2100, air flows past the engine 1974 drawn by the fan 1906 and passes through the front face 1204 of the cooling core 1904, out of the rear face 1206 of the cooling core and into the fan assembly 450. The front face 1204 of the cooling core 1904 is positioned upstream (e.g., toward the rear end 24) of the engine 1974. The rear face 1206 of the cooling core 1904 is orientated upstream of the front face 1204 and is positioned adjacent the fan 1906. In some embodiments, the fan 1906 has a size of 38" to increase flow capacity. In the third orientation 2100, the fan 1906 is on the rear face 1206 of the cooling package 1904 and improves accessibility to the front face 1204 of the cooling cores of the cooling package 1904. Further, the rear face 1206 of the cooling cores of the cooling package 1904 are more accessible than conventional cooling system orientations.

Figure 22:
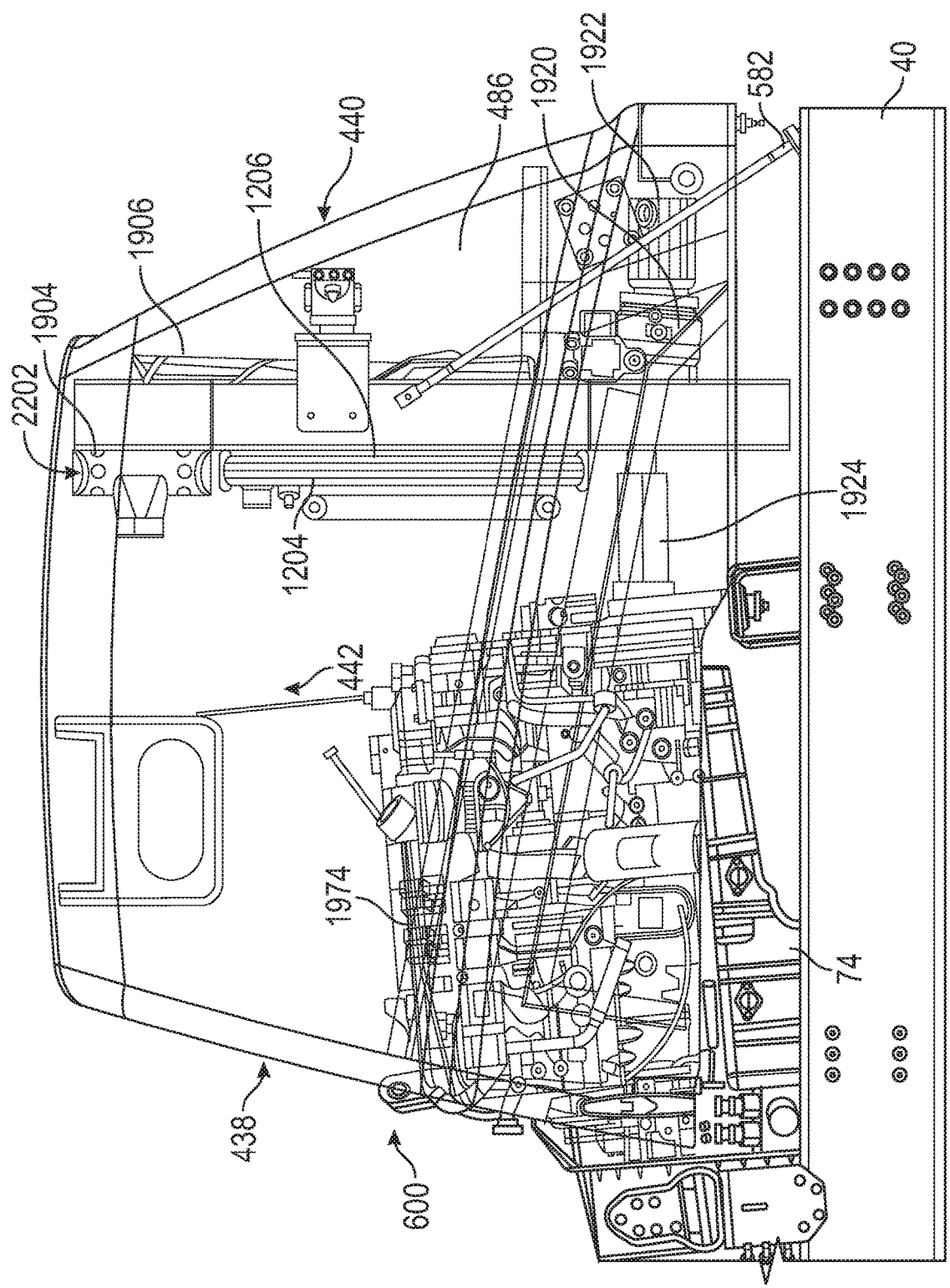
FIG. 22 is a side view of a cooling system with a fan assembly rear of a cooling package core in a fourth orientation, according to another example embodiment.

FIG. 22 shows a fourth orientation 2200 of the cooling system 2202 with a cooling core 1904 and a fan assembly 450 positioned within a hood 486. In the fourth orientation 2200, air flows past the engine 1974 drawn by the fan 1906 and passes through the front face 1204 of the cooling core 1904, out of the rear face 1206 of the cooling core and into the fan assembly 450. The front face 1204 of the cooling core 1904 is positioned downstream (e.g., toward the rear end 24) of the engine 1974. The rear face 1206 of the cooling core 1904 is positioned adjacent the fan 1906. In some embodiments, the fan 1906 has a size of 38" to increase flow capacity. The accessory module 1990 is downstream of the fan assembly 450 and includes drive member 1930 configured to drive the fan motor 416. As shown in FIG. 19, the drive member 1930 is a fan belt. In the fourth orientation 2200, the fan 1906 is on the rear face 1206 of the cooling package 1904 and improves accessibility to the front face 1204 of the cooling cores of the cooling package 1904. Further, the rear face 1206 of the cooling cores of the cooling package 1904 are more accessible than conventional cooling system orientations when the hatch door 422 of the hood 486 is open.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the concrete mixer truck 10 and the components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A hydraulic system for a concrete mixer vehicle, the hydraulic system comprising:
    an electronically controlled variable displacement hydraulic pump;
    a distribution manifold fluidly coupled to the hydraulic pump;
    a hydraulic fan motor coupled to a fan and fluidly coupled to the distribution manifold;
    an auxiliary system fluidly coupled to the distribution manifold; and
    a controller structured to:
        determine a total system demand based at least in part on a fan motor demand and an auxiliary system demand,
        adjust a displacement of the hydraulic pump to satisfy the total system demand, and
        operate the hydraulic pump at a pump speed to satisfy the total system demand.

2. The hydraulic system of claim 1, further comprising a steering pump isolated from the hydraulic pump; and
    a steering gear fluidly coupled to the steering pump.

3. The hydraulic system of claim 2, wherein the steering pump and the hydraulic pump draw from a common low pressure hydraulic oil reservoir.

4. The hydraulic system of claim 1, wherein the auxiliary system includes at least one of a chute manifold, a water pump, or a load span tag axle system.

5. The hydraulic system of claim 4, wherein the chute manifold is in fluid communication with a chute lift actuator, a chute rotation actuator, and a power chute fold/unfold actuator.

6. The hydraulic system of claim 1, wherein the hydraulic pump and the hydraulic fan motor are coupled to a cooling frame.

7. The hydraulic system of claim 6, wherein the hydraulic pump and the hydraulic fan motor are positioned within a common cavity.

8. The hydraulic system of claim 1, further comprising a hydraulic drum motor in fluid communication with the distribution manifold.

9. The hydraulic system of claim 1, further comprising:
a cooling frame; and
a heat exchanger coupled to the cooling frame,
wherein the hydraulic fan motor is coupled to the cooling frame and drives the fan positioned to move air across the heat exchanger.

10. The hydraulic system of claim 9, wherein the hydraulic pump is coupled to the cooling frame.

11. The hydraulic system of claim 9, wherein the fan is positioned between the heat exchanger and a rear of the concrete mixer vehicle.

12. The hydraulic system of claim 9, wherein the fan is positioned downstream of the heat exchanger so that air flows through the heat exchanger before flowing through the fan.

13. The hydraulic system of claim 9, wherein an engine is positioned on a first side of the heat exchanger, and the fan is positioned on a second side of the heat exchanger opposite the first side.

14. The hydraulic system of claim 9, wherein the hydraulic motor, the hydraulic fan motor, and the fan are located on the same side of the cooling frame.

15. The hydraulic system of claim 1, further comprising:
a single hatch movable between an open position and a closed position, the hatch providing access to the hydraulic pump, the hydraulic fan motor, and the distribution manifold.

16. The hydraulic system of claim 15, further comprising:
a heat exchanger defining a cold side adjacent the fan, wherein the fan is coupled to the cooling frame.

17. The hydraulic system of claim 16, wherein the cold side is accessible via the hatch.

18. The hydraulic system of claim 16, wherein the heat exchanger defines a hot side that is accessible from an engine side of the cooling frame.

19. A system comprising:
a vehicle frame;
an engine mounted to the vehicle frame;
a concrete mixing drum coupled to the vehicle frame;
an electronically controlled variable displacement hydraulic pump;
a distribution manifold fluidly coupled to the hydraulic pump;
a cooling system including
a cooling frame coupled to the vehicle frame,
a heat exchanger coupled to the cooling frame,
a fan positioned adjacent the heat exchanger toward a rear of the vehicle frame, and
a hydraulic fan motor coupled to a fan and fluidly coupled to the distribution manifold,
wherein the hydraulic pump is coupled to the cooling frame;
a hydraulic drum motor in fluid communication with the distribution manifold;
a load span tag axle system in fluid communication with the distribution manifold;
a chute manifold in fluid communication with the distribution manifold; and
a controller structured to:
determine a total system demand based at least in part on a fan motor demand, a hydraulic drum motor demand, a load span tag axle system demand, and a chute manifold demand,
adjust a displacement of the hydraulic pump to satisfy the total system demand, and
operate the hydraulic pump at a pump speed to satisfy the total system demand.

20. A method comprising:
providing a pressurized hydraulic fluid from an electronically controlled variable displacement hydraulic pump to a distribution manifold;
operating a hydraulic fan motor with hydraulic fluid from the distribution manifold;
operating a hydraulic drum motor with hydraulic fluid from the distribution manifold;
operating a load span tag axle system with hydraulic fluid from the distribution manifold;
operating a chute manifold with hydraulic fluid from the distribution manifold;
determining a total system demand based at least in part on a fan motor demand, a hydraulic drum motor demand, a load span tag axle system demand, and a chute manifold demand;
adjusting a displacement of the hydraulic pump to satisfy the total system demand; and
operating the hydraulic pump at a pump speed to satisfy the total system demand.

* * * * *